United States Patent
Isokawa et al.

(10) Patent No.: US 11,646,051 B2
(45) Date of Patent: May 9, 2023

(54) MAGNETIC DISK DEVICE AND REFRESH THRESHOLD SETTING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroshi Isokawa, Yokohama Kanagawa (JP); Nobuhiro Maeto, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/591,957

(22) Filed: Feb. 3, 2022

(65) Prior Publication Data

US 2023/0061895 A1    Mar. 2, 2023

(30) Foreign Application Priority Data

Sep. 1, 2021  (JP) .............................. JP2021-142613

(51) Int. Cl.
  *G11B 20/18*  (2006.01)
  *G11B 5/012*  (2006.01)
  *G11B 5/00*  (2006.01)

(52) U.S. Cl.
  CPC ...... *G11B 5/012* (2013.01); *G11B 2005/0021* (2013.01)

(58) Field of Classification Search
  CPC ... G11B 5/02; G11B 5/2655; G11B 2020/183; G11B 20/1816; G11B 5/5526; G11B 5/012; G11B 5/09; G11B 5/59688; G11B 5/59638; G11B 20/1217; G11B 2005/001; G11B 2005/0021; G11B 20/1889; G11B 2020/2516
  USPC .............................................. 360/31, 48, 53
  See application file for complete search history.

(56) References Cited

U.S. PATENT DOCUMENTS

| | | | |
|---|---|---|---|
| 8,279,547 B2 | 10/2012 | Shim et al. | |
| 8,941,937 B1* | 1/2015 | Toribio | G11B 20/10305 360/31 |
| 10,916,266 B2 | 2/2021 | Tomoda et al. | |
| 2020/0411051 A1 | 12/2020 | Maeto et al. | |
| 2021/0272588 A1* | 9/2021 | Kawana | G11B 5/2655 |

FOREIGN PATENT DOCUMENTS

| | | |
|---|---|---|
| JP | 2020-135909 A | 8/2020 |
| JP | 2021-009747 A | 1/2021 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a disk that includes a first track, a head that includes a heater, writes data to the disk, and reads data from the disk, and a controller configured to set a variation of a parameter related to a write process for the disk within one round of the first track to suppress a variation of an evaluation index corresponding to a write/read processing characteristic within one round of the first track.

15 Claims, 11 Drawing Sheets

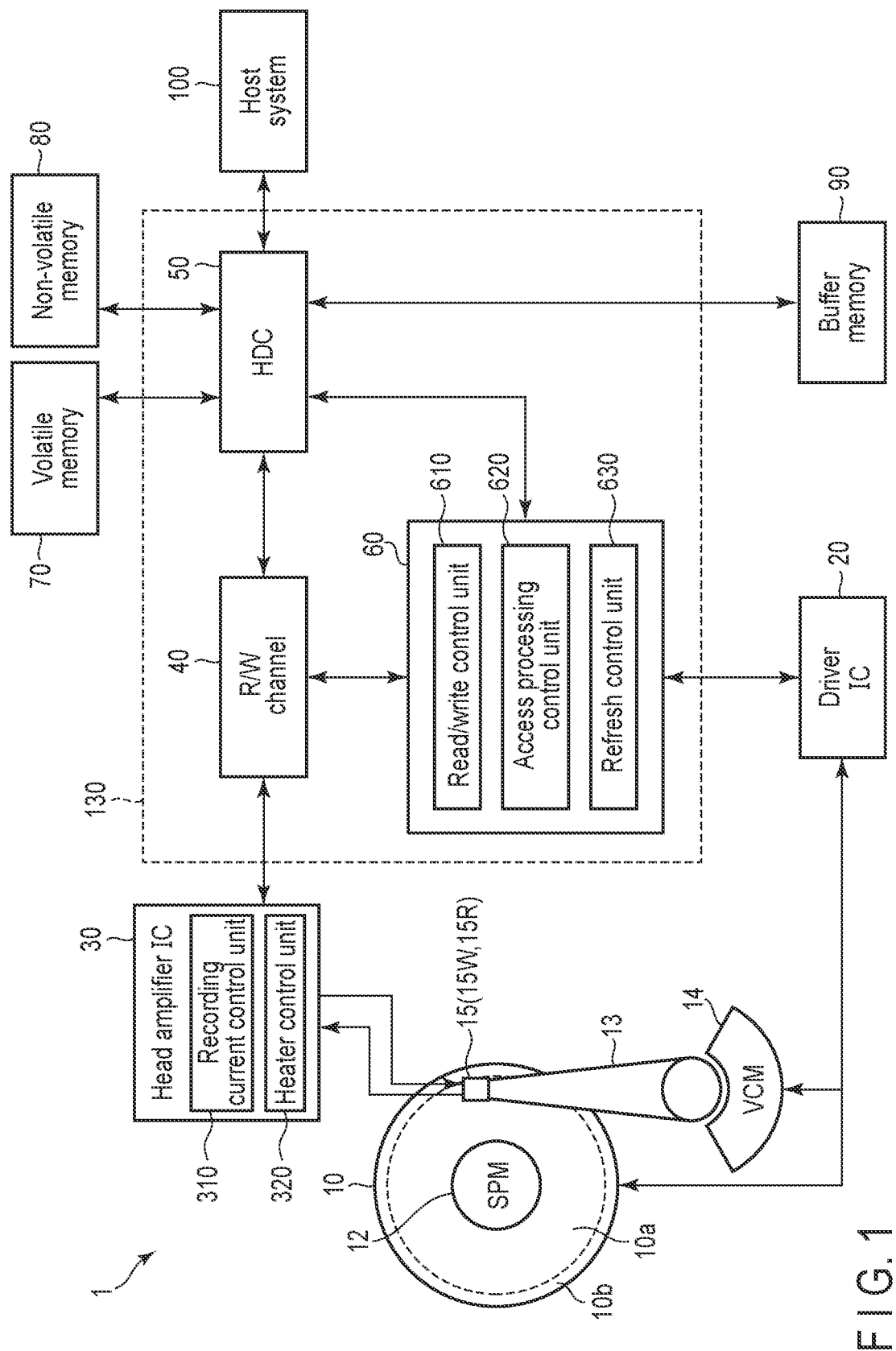
F I G. 1

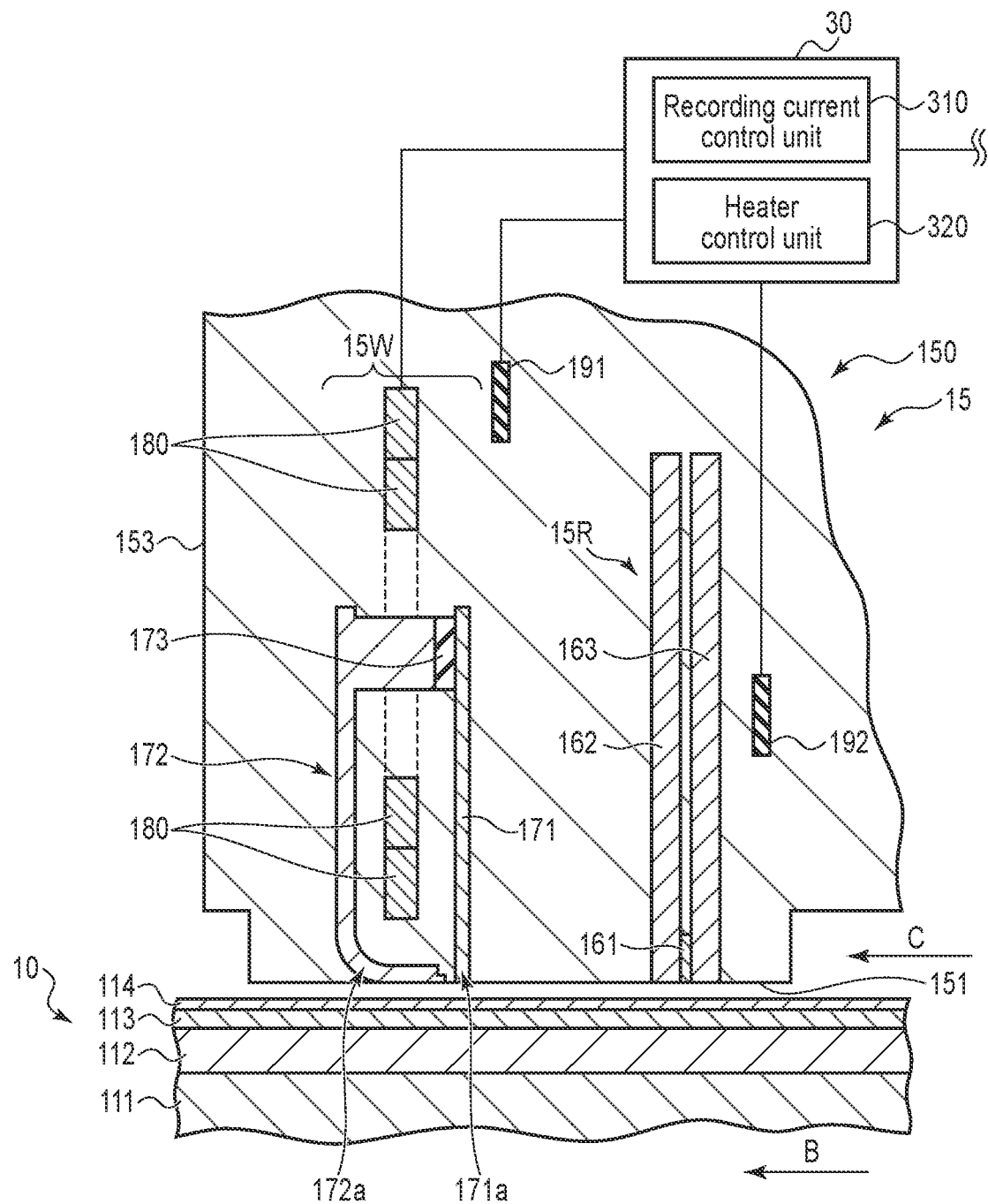
F I G. 3

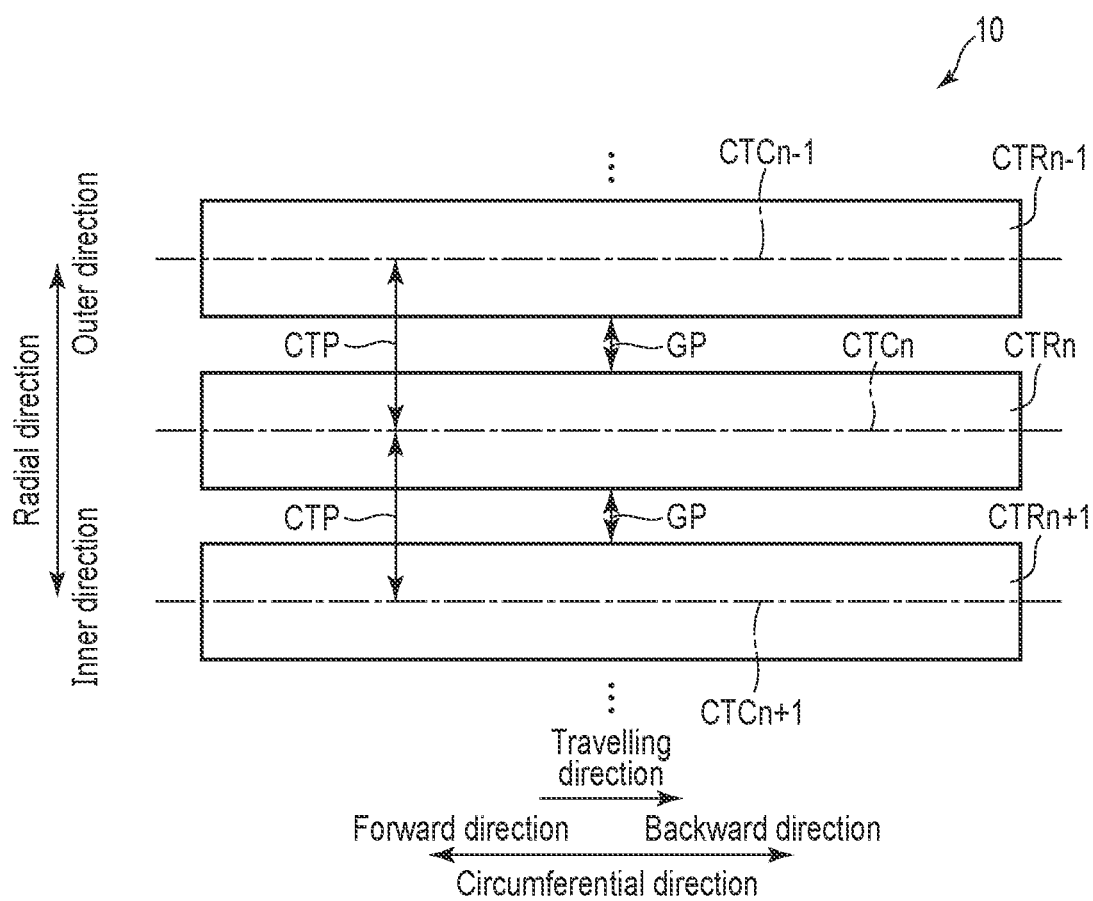
F I G. 4

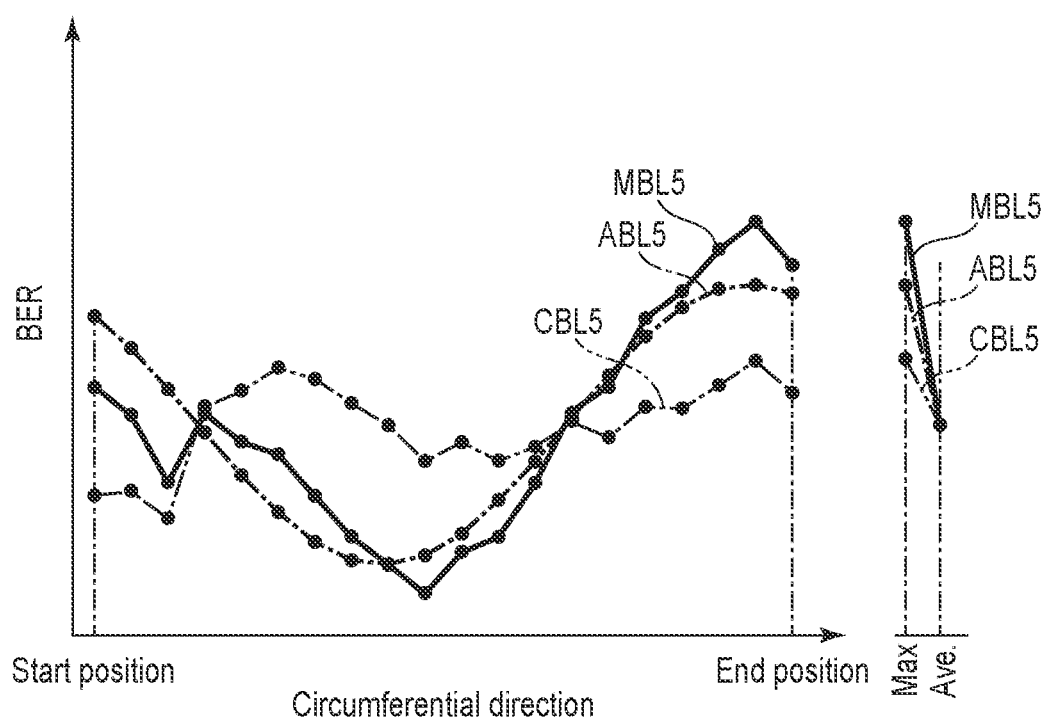
F I G. 5

US 11,646,051 B2

MAGNETIC DISK DEVICE AND REFRESH THRESHOLD SETTING METHOD

CROSS-REFERENCE TO RELATED APPLICATIONS

This application is based upon and claims the benefit of priority from Japanese Patent Application No. 2021-142613, filed Sep. 1, 2021, the entire contents of which are incorporated herein by reference.

FIELD

Embodiments described herein relate generally to a magnetic disk device and a refresh threshold setting method.

BACKGROUND

With an increase in recording density of a magnetic disk (hereinafter, simply referred to as a disk) of a magnetic disk device, a variation of a recording/reading characteristic within one round of the disk due to non-uniformity of a magnetic film or the like of the disk, mechanical characteristics, or the like has become apparent as an evaluation index variation such as a bit error rate (BER). In a particular track of the disk, the BER is desirably constant.

Further, in the magnetic disk device, side erasing in which data is erased may occur due to an influence (Adjacent Track Interference: ATI) of a leakage magnetic flux or the like from a head when data is written. In order to prevent the side erasing, the magnetic disk device has a process (refresh process or rewrite process) of rewriting data of a particular track when the number of times of writing data to peripheral tracks of the particular track exceeds a specified number.

BRIEF DESCRIPTION OF THE DRAWINGS

FIG. 1 is a block diagram illustrating a configuration of a magnetic disk device according to an embodiment.

FIG. 3 is an enlarged cross-sectional view illustrating an example of a disk and a head.

FIG. 4 is a schematic diagram illustrating an example of a write process.

FIG. 5 is a schematic diagram illustrating an example of an actual measurement evaluation index variation, an approximate evaluation index variation, and a correction evaluation index variation with respect to a circumferential position of a particular track.

DETAILED DESCRIPTION

Figure 2:
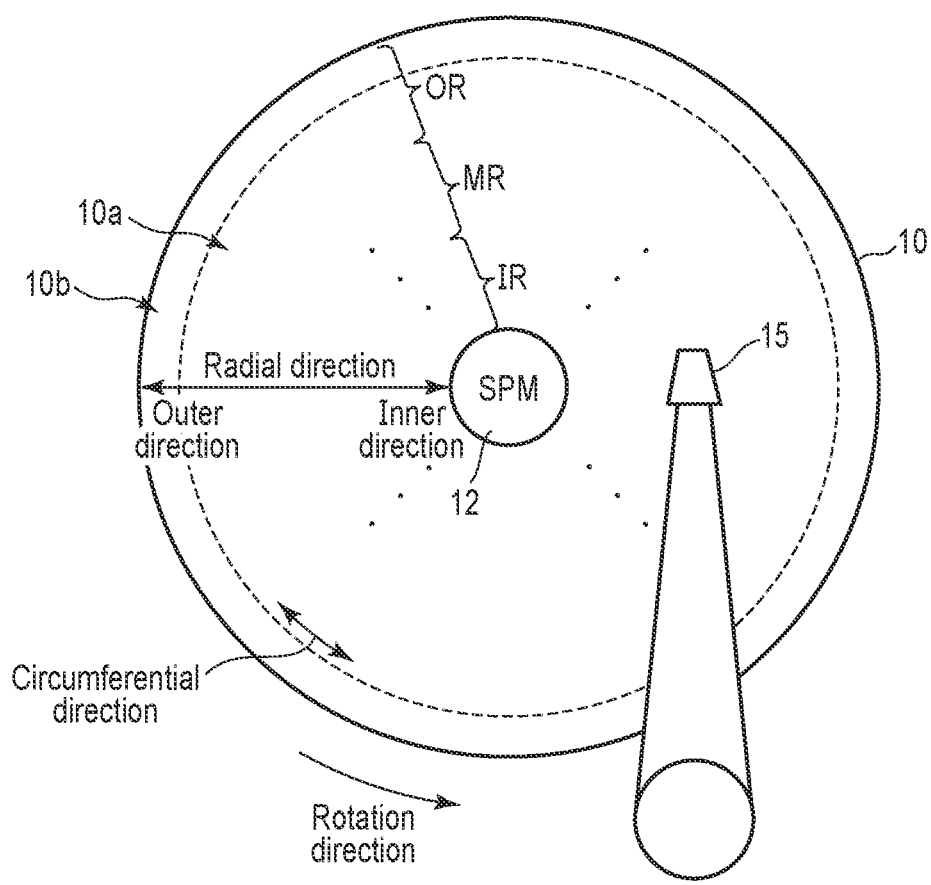
FIG. 2 is a schematic diagram illustrating an example of a disk according to the embodiment.

In general, according to one embodiment, a magnetic disk device comprising: a disk that includes a first track; a head that includes a heater, writes data to the disk, and reads data from the disk; and a controller configured to set a variation of a parameter related to a write process for the disk within one round of the first track to suppress a variation of an evaluation index corresponding to a write/read processing characteristic within one round of the first track.

Hereinafter, embodiments will be described with reference to the drawings. Incidentally, the drawings are an example, and do not limit the scope of the invention.

Embodiment

FIG. 1 is a block diagram illustrating a configuration of a magnetic disk device 1 according to an embodiment.

The magnetic disk device 1 includes a head disk assembly (HDA) described later, a driver IC 20, a head amplifier integrated circuit (hereinafter, a head amplifier IC or a preamplifier) 30, a volatile memory 70, and non-volatile memory 80, a buffer memory (buffer) 90, and a system controller 130 which is an integrated circuit of a chip. In addition, the magnetic disk device 1 is connected to a host system (hereinafter, simply referred to as a host) 100.

The HDA has a magnetic disk (hereinafter, referred to as a disk) 10, a spindle motor (hereinafter, referred to as a SPM) 12, an arm 13 on which a head 15 is mounted, and a voice coil motor (hereinafter, referred to as a VCM) 14. The disk 10 is attached to the SPM 12 and rotates by driving of the SPM 12. The arm 13 and the VCM 14 form an actuator. The actuator controls the movement of the head 15 mounted on the arm 13 to a particular position on the disk 10 by the driving of the VCM 14. The disk 10 and the head 15 may be provided in two or more numbers.

In the disk 10, a user data region 10a which can be used by a user and a system area 10b which writes information necessary for system management are allocated in an area of the disk where data can be written. Hereinafter, a direction from the inner circumference to the outer circumference of the disk 10 or a direction from the outer circumference to the inner circumference of the disk 10 is referred to as a radial direction. In the radial direction, the direction from the inner circumference to the outer circumference is referred to as an outer direction (or an outer side), and the direction from the outer circumference to the inner circumference is referred to as an inner direction (or an inner side). That is, a circumferential direction corresponds to a direction along the circumference of the disk 10. The radial direction and the circumferential direction are orthogonal to each other. Further, a particular position of the disk 10 in the radial direction may be referred to as a radial position, and a particular position of the disk 10 in the circumferential direction may be referred to as a circumferential position. The radial position and the circumferential position may be collectively referred to as a position. The user data region 10a of the disk 10 may be segmented into a plurality of areas. For example, the user data region 10a may be segmented for each area (hereinafter, may be referred to as a zone) including a particular number of tracks in the radial direction. The zones may be segmented for each track in the radial direction.

Incidentally, the "track" is used for various meanings such as one recording area among a plurality of recording areas obtained by segmenting the disk 10 in the radial direction, a recording area for one round at a particular radial position of the disk 10, a particular recording area of a particular radial position of the disk 10, a recording area extending in the circumferential direction of the disk 10, a recording area corresponding to a path of the head 15 positioned at a particular radial position of the disk 10, a path of the head 15 positioned at a particular radial position of the disk 10, data written in one recording area among a plurality of recording areas obtained by segmenting the disk 10 in the radial direction, data written in a recording area for one round at a particular radial position of the disk 10, data written in a particular recording area of a particular radial position of the disk 10, data written in a recording area extending in the circumferential direction of the disk 10, data written in a recording area corresponding to a path of the head 15 positioned at a particular radial position of the disk 10, data written along a path of the head 15 positioned at a particular radial position of the disk 10, data extending in the circumferential direction in the disk 10, data written in a particular track of the disk 10, data for one round written in a particular track of the disk 10, and a part of data written in a particular track of the disk 10. The "sector" is used for various meanings such as one recording area among a plurality of recording areas obtained by segmenting a particular track of the disk 10 in the circumferential direction, one recording area among a plurality of recording areas obtained by segmenting a recording area extending in the circumferential direction at a particular radial position of the disk 10, a particular recording area of a particular track of the disk 10, a particular circumferential position of a particular track of the disk 10, a particular circumferential position (particular position) at a particular radial position of the disk 10, data written in one recording area among a plurality of recording areas obtained by segmenting a particular track of the disk 10 in the circumferential direction, data written in one recording area of a plurality of recording areas obtained by segmenting a recording area extending in the circumferential direction at a particular radial position of the disk 10, data written in a particular recording area of a particular track of the disk 10, data written at a particular circumferential position of a particular track of the disk 10, data written at a particular circumferential position (particular position) at a particular radial position of the disk 10, and data written in a particular sector. The "radial width of the track" may be referred to as a "track width". The "path passing through a center position of a track width in a particular track" may also be referred to as a "track center". The data written in the user data region 10a and available by the user may be referred to as user data.

The head 15 includes a slider 150 as a main body, and a write head 15W and a read head 15R mounted on the slider 150. The write head 15W writes data to the disk 10. The read head 15R reads the data recorded on the disk 10. Incidentally, the "write head 15W" may be simply referred to as a "head 15", the "read head 15R" may be simply referred to as a "head 15", or the "write head 15W and read head 15R" may be collectively referred to simply as the "head 15". The "center portion of the head 15" may be referred to as the "head 15", the "center portion of the write head 15W" may be referred to as the "write head 15W", and the "center portion of the read head 15R" may be referred to as the "read head 15R". The "center portion of the write head 15W" may be simply referred to as the "head 15", and the "center portion of the read head 15R" may be simply referred to as the "head 15". "Positioning the center portion of head 15 at the track center of a particular track" may be expressed as "positioning the head 15 on a particular track", "arranging the head 15 on a particular track", "positioning the head 15 on a particular track", or the like.

FIG. 2 is a schematic diagram illustrating an example of the disk 10 according to the embodiment. As illustrated in FIG. 2, in the circumferential direction, a direction in which the disk 10 rotates is referred to as a rotation direction. Incidentally, in the example illustrated in FIG. 2, the rotation direction is illustrated as a counterclockwise direction but may be as an opposite (clockwise) direction. In the example illustrated in FIG. 2, the disk 10 is segmented into an inner circumference area IR positioned in the inner direction, an outer circumference area OR positioned in the outer direction, and a middle circumference area MR positioned between the inner circumference area IR and the outer circumference area OR.

In the example illustrated in FIG. 2, the disk 10 includes a user data region 10a and a system area 10b. In FIG. 2, the user data region 10a and the system area 10b are adjacent in the radial direction. Here, "adjacent" includes not only that data, objects, areas, spaces, or the like are arranged to be in contact, but also that data, objects, areas, spaces, or the like are arranged at particular intervals. In FIG. 2, the system area 10b is adjacent to the outer direction of the user data region 10a. Incidentally, the system area 10b may be adjacent to the inner direction of the user data region 10a. Further, the system area 10b may be arranged between the user data regions 10a in the radial direction.

In the example illustrated in FIG. 2, the user data region 10a is arranged over the outer circumference area OR to the inner circumference area IR. The system area 10b is arranged in the outer circumference area OR. Incidentally, the system area 10b may be arranged in the inner circumference area IR or the middle circumference area MR. The system area 10b may be dispersedly arranged in the outer circumference area OR, the middle circumference area MR, or the inner circumference area IR.

As illustrated in FIG. 2, the head 15 is driven by the VCM 14 with respect to the disk 10 to rotate around a rotation axis and moves from the inner side toward the outer side to be arranged at a particular position, or moves from the outer side toward the inner side to be arranged at a particular position.

FIG. 3 is an enlarged cross-sectional view illustrating an example of the disk 10 and the head 15. Hereinafter, a direction from the head 15 toward the disk 10 is referred to as a lower direction (or a lower side), and a direction from the disk 10 toward the head 15 is referred to as an upper direction (or an upper side). In FIG. 3, a rotation direction B of the disk 10 coincides with the direction of an air flow C.

In the example illustrated in FIG. 3, in the disk 10, a substrate 111, a soft magnetic layer 112, a magnetic recording layer 113, and a protective film layer 114 are sequentially laminated. The substrate 111 is formed of a disk-shaped non-magnetic body. The soft magnetic layer 112 is formed of a material exhibiting soft magnetic properties on the substrate 111. The magnetic recording layer 113 has magnetic anisotropy in a direction perpendicular to the surface of the disk 10 on the soft magnetic layer 112. The protective film layer 114 is formed on the magnetic recording layer 113.

In the example illustrated in FIG. 3, the head 15 includes the slider 150. The slider 150 is formed of, for example, a sintered body (AlTiC) of alumina and titanium carbide. The slider 150 has a disk facing surface (air bearing surface (ABS)) 151 facing the surface of the disk 10 and a trailing end 153 positioned on the outflow side of the air flow C. The slider 150 includes the write head 15W, the read head 15R, a heater 191, and a heater 192. Parts of the read head 15R and the write head 15W are exposed to the disk facing surface 151. The heater 191 is arranged between the write head 15W and the read head 15R. The heater 192 is arranged on the side opposite to the write head 15W with respect to the read head 15R. In other words, the read head 15R is arranged between the heaters 191 and 192.

The read head 15R includes a magnetic film 161, a shield film 162, and a shield film 163. The magnetic film 161 is positioned between the shield film 162 and the shield film 163 and produces a magnetoresistance effect. The shield film 162 is positioned on the trailing end 153 side with respect to the magnetic film 161. The shield film 163 faces the shield film 162. The lower ends of the magnetic film 161, the shield film 162, and the shield film 163 are exposed to the disk facing surface 151.

The write head 15W is provided on the trailing end 153 side of the slider 150 with respect to the read head 15R. The write head 15W includes a main magnetic pole 171, a trailing shield (write shield) 172, and a recording coil 180 arranged to be wound around a magnetic circuit including the main magnetic pole 171 and the write shield 172 in order to flow a magnetic flux to the main magnetic pole 171.

The main magnetic pole 171 is made of a soft magnetic material having a high saturation magnetic flux density. The main magnetic pole 171 generates a recording magnetic field in a direction perpendicular to the surface of the disk 10 in order to magnetize the magnetic recording layer 113 of the disk 10. In the example illustrated in FIG. 3, the main magnetic pole 171 extends substantially perpendicular to the disk facing surface 151. The lower surface of a distal end portion 171a of the main magnetic pole 171 on the disk facing surface 151 side is exposed to the disk facing surface 151. The distal end portion 171a of the main magnetic pole 171 is tapered toward the disk facing surface 151, and is formed in a columnar shape having a narrower width than the other portions. The width of the distal end portion 171a of the main magnetic pole 171 in a cross track direction substantially corresponds to the track width of the track. The cross track direction is, for example, a direction along the radial direction.

The write shield 172 is formed of a soft magnetic material having a high saturation magnetic flux density. The write shield 172 is provided to efficiently close a magnetic path via the soft magnetic layer 112 immediately below the main magnetic pole 171. The write shield 172 is positioned on the trailing end 153 side with respect to the main magnetic pole 171. The write shield 172 is connected to the main magnetic pole 171 via an insulator 173. The main magnetic pole 171 and the write shield 172 are electrically insulated and form a magnetic circuit. The write shield 172 is formed in a substantially L shape and has a distal end portion 172a facing the distal end portion 171a of the main magnetic pole 171 with a write gap. The lower surface of the distal end portion 172a is exposed to the ABS 151 of the slider 150.

The recording coil 180 is provided to be wound around the magnetic circuit including the main magnetic pole 171 and the write shield 172 in order to flow a magnetic flux to the main magnetic pole 171. The recording coil 180 is provided, for example, between the main magnetic pole 171 and the write shield 172. When a current (may also be referred to as a recording current (Iw) or a write current (Iw)) of a particular magnitude is supplied to the recording coil 180, a recording magnetic field is excited in the main magnetic pole 171 and the write shield 172. Therefore, the main magnetic pole 171 and the write shield 172 are magnetized. By changing a magnetization direction of a recording bit of the magnetic recording layer 113 of the disk 10 by the magnetic flux flowing through the magnetized main magnetic pole 171 and write shield 172, a magnetization pattern corresponding to the recording current is recorded on the disk 10.

The driver IC 20 controls the driving of the SPM 12 and the VCM 14 according to the control of the system controller 130 (specifically, an MPU 60 described later).

The head amplifier IC (preamplifier) 30 includes a read amplifier, a write driver, for example, a recording current control unit 310, a heater control unit 320, and the like. The read amplifier amplifies a read signal read from the disk 10 and outputs the signal to the system controller 130 (specifically, a read/write (R/W) channel 40 described later). The recording current control unit 310 is electrically connected to the write head 15W, and supplies a recording current corresponding to write data output from the R/W channel 40 to the write head 15W. In one example, the recording current control unit 310 is electrically connected to the recording coil 180, and supplies the recording current corresponding to the write data output from the R/W channel 40 to the recording coil 180. The recording current control unit 310 supplies the recording current to the write head 15W according to the control of the system controller 130, for example, the MPU 60. For example, the recording current control unit 310 supplies the recording current to the recording coil 180 according to the control of the MPU 60. The heater control unit 320 is electrically connected to the heaters 191 and 192, and supplies a current, which is output from the R/W channel 40, for driving the heaters to the heaters 191 and 192. The heater control unit 320 supplies a current to the heaters 191 and 192 according to the control of the system controller 130, for example, the MPU 60. When the heater control unit 320 supplies a current to the heaters 191 and 192, the heaters 191 and 192 generate heat to heat the portion of the slider 150 around the heaters 191 and 192. Accordingly, the slider 150, the write head 15W, and the read head 15R are thermally expanded, and the ABS 151 protrudes to the surface side of the disk 10. In this manner, the flying height (a distance between the ABS 151 and the surface of the disk 10) of the head 15 can be adjusted by the heaters 191 and 192. The magnitude of expansion of the slider 150, the write head 15W, and the read head 15R is adjusted by the value of the current (or voltage) applied to the heaters 191 and 192. That is, the flying height of the head 15 is adjusted by the value of the current (or voltage) applied to the heaters 191 and 192.

The volatile memory 70 is a semiconductor memory in which stored data is lost when the power supply is cut off. The volatile memory 70 stores data and the like required for processing in each unit of the magnetic disk device 1. The volatile memory 70 is, for example, a Dynamic Random Access Memory (DRAM) or a Synchronous Dynamic Random Access Memory (SDRAM).

The non-volatile memory 80 is a semiconductor memory which records data stored even when the power supply is cut off. The non-volatile memory 80 is, for example, a NOR type or NAND type Flash Read Only Memory (flash ROM: FROM).

The buffer memory 90 is a semiconductor memory which temporarily records data and the like transmitted and received between the magnetic disk device 1 and the host 100. Incidentally, the buffer memory 90 may be integrally configured with the volatile memory 70. The buffer memory 90 is, for example, a DRAM, a Static Random Access Memory (SRAM), an SDRAM, a Ferroelectric Random Access memory (FeRAM), a Magnetoresistive Random Access Memory (MRAM), or the like.

The system controller (controller) 130 is realized, for example, by using a large-scale integrated circuit (LSI) which is referred to as a System-on-a-Chip (SoC) in which a plurality of elements is integrated on a single chip. The system controller 130 includes a read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the non-volatile memory 80, the buffer memory 90, and the host 100.

The R/W channel 40 executes signal processing of read data transferred from the disk 10 to the host 100 and write data transferred from the host 100 in response to an instruction from the MPU 60 described later. The R/W channel 40 has a circuit or a function for measuring the signal quality of the read data. The R/W channel 40 is electrically connected to, for example, the head amplifier IC 30, the HDC 50, and the MPU 60.

The HDC 50 controls the transfer of data. For example, the HDC 50 controls data transfer between the host 100 and the R/W channel 40 in response to the instruction from the MPU 60 described later. The HDC 50 is electrically connected to, for example, the R/W channel 40, the MPU 60, the volatile memory 70, the non-volatile memory 80, and the buffer memory 90.

The MPU 60 is a main controller which controls each unit of the magnetic disk device 1. The MPU 60 controls the VCM 14 via the driver IC 20 and executes servo control for positioning the head 15. The MPU 60 controls the SPM 12 via the driver IC 20 and rotates the disk 10. The MPU 60 controls the operation of writing data to the disk 10 and selects the storage destination of the data transferred from the host 100, for example, the write data. The MPU 60 controls the operation of reading the data from the disk 10 and controls the processing of the data transferred from the disk 10 to the host 100, for example, the read data. Further, the MPU 60 manages an area in which data is recorded. The MPU 60 is connected to each unit of the magnetic disk device 1. The MPU 60 is electrically connected to, for example, the driver IC 20, the R/W channel 40, and the HDC 50.

The MPU 60 includes a read/write control unit 610, an access processing control unit 620, and a refresh control unit 630. The MPU 60 executes processing of each unit, for example, the read/write control unit 610, the access processing control unit 620, the refresh control unit 630, and the like on firmware. Incidentally, the MPU 60 may include each unit, for example, a read/write control unit 610, an access processing control unit 620, and a refresh control unit 630 as a circuit. The read/write control unit 610, the access processing control unit 620, the refresh control unit 630, and the like may be included in the R/W channel 40 or the HDC 50.

The read/write control unit 610 controls a read process of reading data from the disk 10 and a write process of writing data to the disk 10 according to a command or the like from the host 100. The read/write control unit 610 controls the VCM 14 via the driver IC 20, positions the head 15 at a particular position on the disk 10, and executes the read process or the write process. Hereinafter, the term "access" may be used for meanings such as recording or writing data in a particular area (or a write process), reading out or reading data from a particular area (or a read process), or moving the head 15 or the like to a particular area.

The read/write control unit 610 executes normal recording of writing a track (hereinafter, may be referred to as an adjacent track) adjacent to the radial side of a particular track with a particular interval (gap) in the radial direction in a particular area of the disk 10 according to a command or the like from the host 100 or writing data randomly. Incidentally, the read/write control unit 610 may execute shingled recording in which the next track is overwritten on a part of the track in the radial direction for each particular area (hereinafter may be referred to as a band or a band area) of the disk 10 according to a command or the like from the host 100. Hereinafter, "perform normal recording" and/or "perform shingled recording" may be simply referred to as "write". Writing to an adjacent track of a particular track may be referred to as "fringe write".

FIG. 4 is a schematic diagram illustrating an example of the write process. FIG. 4 illustrates a traveling direction in the circumferential direction. A direction in which the head 15 sequentially writes and reads data with respect to the disk 10 in the circumferential direction, that is, a direction in which the head 15 travels with respect to the disk 10 in the circumferential direction may be referred to as the traveling direction. For example, the traveling direction is opposite to the rotation direction of the disk 10. Incidentally, the traveling direction may be the same as the rotation direction of the disk 10. In the circumferential direction, the traveling direction may be referred to as a backward direction or simply as backward. In the circumferential direction, a direction opposite to the backward direction may be referred to as a forward direction or simply as forward. FIG. 4 illustrates tracks CTRn−1, CTRn, and CTRn+1. In FIG. 4, for example, the track widths of the tracks CTRn−1, CTRn, and CTRn+1 are the same. Terms such as "same", "identical", "coincide", and "equivalent" include not only the meaning of exactly the same but also the meaning of being different to an extent that can be regarded as being substantially the same. Incidentally, the track widths of the tracks CTRn−1 to CTRn+1 may be different. FIG. 4 illustrates a track center CTCn−1 of the track CTRn−1, a track center CTCn of the track CTRn, and a track center CTCn+1 of the track CTRn+1. In the example illustrated in FIG. 4, the tracks CTRn−1, CTRn, and CTRn+1 are written at track pitches CTP. The track center CTCn−1 of the track CTRn−1 and the track center CTCn of the track CTRn are separated by the track pitch CTP. The track center CTCn of the track CTRn and the track center CTCn+1 of the track CTRn+1 are separated by the track pitch CTP. The track CTRn−1 and the track CTRn are separated by a gap GP. The track CTRn and the track CTRn+1 are separated by the gap GP. Incidentally, the tracks CTRn−1 to CTRn+1 may be written at different track pitches. In FIG. 4, for convenience of description, each track is illustrated in a rectangular shape extending in the circumferential direction with a particular track width, but is actually curved along the circumferential direction. Further, each track may have a wave shape extending in the circumferential direction while varying in the radial direction.

In the example illustrated in FIG. 4, the read/write control unit 610 positions the head 15 at the track center CTCn−1 in a particular area of the disk 10 and writes (or normally records) the track CTRn−1 or a particular sector of the track CTRn−1.

The read/write control unit 610 positions the head 15 at the track center CTCn spaced apart by the track pitch CTP from the track center CTCn−1 of the track CTRn−1 in the inner direction, and writes (or normally records) the track CTRn or a particular sector of the track CTRn.

The read/write control unit 610 positions the head 15 at the track center CTCn+1 spaced apart by the track pitch CTP from the track center CTCn of the track CTRn in the inner direction, and writes (or normally records) the track CTRn+1 or a particular sector of the track CTRn+1.

The read/write control unit 610 may sequentially write (or normally record) the tracks CTRn−1, CTRn, and CTRn+1 in a particular area of the disk 10, or may randomly write (or normally record) a particular sector of the track CTRn−1, a particular sector of the track CTRn, and a particular sector of the track CTRn+1.

The access processing control unit 620 controls an access process, for example, the write process and the read process. The access processing control unit 620 controls a characteristic value (hereinafter, may be referred to as a write processing parameter or simply as a parameter) corresponding to the write process based on an evaluation index corresponding to write and read processing characteristics of a particular recording area, such as a zone, a track, or a sector, of the disk 10. The evaluation index includes, for example, an error rate (bit error rate: BER) and the like. The write processing parameters include, for example, a recording density (bits per inch: BPI), a recording current, a heater setting value corresponding to a value of a current (or voltage) applied to the heater, a data transfer speed, and a recording frequency at the time of writing data (hereinafter, may be simply referred to as a recording frequency) corresponding to the recording density of a particular area. Hereinafter, for convenience of description, "a BER of data written in a particular recording area" may be simply referred to as "a BER of a particular recording area", "a recording density of data to be written in a particular recording area" may be simply referred to as "a recording density of a particular recording area", "a recording current at the time of writing data in a particular recording area" may be simply referred to as "a recording current of a particular recording area", "a heater setting value at the time of writing data in a particular recording area" may be simply referred to as "a heater setting value of a particular recording area", "a data transfer speed at the time of writing data in a particular recording area" may be simply referred to as "a transfer speed of a particular recording area", and "a recording frequency at the time of writing data to particular recording area" may be simply referred to as "a recording frequency of a particular recording area". The evaluation index may include a meaning of a frequency of a signal corresponding to the evaluation index. The BER may include a meaning of a frequency of a signal corresponding to the BER. The write processing parameter may include a meaning of a frequency of a signal corresponding to the write processing parameter. The recording density, the recording current, the heater setting value, the transfer speed, or the recording frequency may include a meaning of a frequency of a signal corresponding to the recording density, the recording current, the heater setting value, the transfer speed, or the recording frequency.

Based on a variation of the evaluation index within one round of a particular track (hereinafter, may be simply referred to as an evaluation index variation), for example, a variation of the BER within one round of this track (hereinafter, may be simply referred to as a BER variation), the access processing control unit 620 controls a variation of the write processing parameter within one round of this track (hereinafter, may be simply referred to as a write processing parameter variation), for example, a variation of the recording density within one round of this track (hereinafter, may be simply referred to as a recording density variation), a variation of the recording current within one round of this track (hereinafter, may be simply referred to as a recording current variation), a variation of the heater setting value within one round of this track (hereinafter, may be simply referred to as a heater setting value variation), a variation of the transfer speed within one round of this track (hereinafter, may be simply referred to as a transfer speed variation), or a variation of the recording frequency within one round of this track (hereinafter, may be simply referred to as a recording frequency variation).

Based on each evaluation index for each particular area in a particular track, for example, for each region obtained by segmenting the particular track (hereinafter, may be referred to as a segmented area), for example, each BER of each segmented area of the particular track, the access processing control unit 620 controls each write processing parameter of each segmented area of the track, for example, each recording density, each recording current, each heater setting value, each transfer speed, or each recording frequency of each segmented area of the track. The segmented area corresponds to one area of a plurality of areas obtained by segmenting a particular track in the circumferential direction. The segmented area may be configured of a plurality of sectors in a particular track, for example. Incidentally, the circumferential direction lengths of the segmented areas may be the same or different. In other words, the plurality of segmented areas of the particular track may have the same number of sectors, or may have different numbers of sectors. Further, the segmented area may correspond to one sector of the particular track.

Based on each evaluation index of each circumferential position of a particular track, for example, each BER of each circumferential position of the particular track, the access processing control unit 620 controls each write processing parameter of each circumferential position of the track, for example, each recording density, each recording current, each heater setting value, each transfer speed, or each recording frequency of each circumferential position of the track.

Based on each evaluation index of each sector of a particular track, for example, each BER of each sector of the particular track, the access processing control unit 620 controls each write processing parameter of each sector of the track, for example, each recording density, each recording current, each heater setting value, each transfer speed, or each recording frequency of each sector of the track.

The access processing control unit 620 sets a write processing parameter in a particular track to a certain write processing parameter as a reference (hereinafter, may be referred to as a reference write processing parameter), and measures the evaluation index variation (hereinafter, may be referred to as an actual measurement evaluation index variation) in this track. Based on the measured actual measurement evaluation index variation of the track, the access processing control unit 620 calculates a variation of the change amount of the write processing parameter from the reference write processing parameter (hereinafter, may be referred to as a write processing parameter correction amount variation or a write processing parameter change amount variation) in the track for uniformly adjusting or suppressing the actual measurement evaluation index variation. The access processing control unit 620 adds (or subtracts) the write processing parameter correction amount variation to the reference write processing parameter in this track. Accordingly, the access processing control unit 620 corrects (or adjusts) the reference write processing parameter of this track to the variation of the write processing parameter (hereinafter, may be referred to as a correction write processing parameter variation or a correction parameter variation) of this track. The access processing control unit 620 sets the correction write processing parameter variation in this track.

Incidentally, the access processing control unit 620 sets a write processing parameter in a particular track as the reference write processing parameter at the time of idle or in real time, and measures the actual measurement evaluation index variation in this track. Based on the measured actual measurement evaluation index variation of the track at the time of idle or in real time, the access processing control unit 620 calculates the write processing parameter correction amount variation in the track. The access processing control unit 620 adds (or subtracts) the write processing parameter correction amount variation to the reference write processing parameter in this track at the time of idle or in real time. Accordingly, the access processing control unit 620 corrects (or adjusts) the reference write processing parameter of this track to the correction write processing parameter variation of this track at the time of idle or in real time. The access processing control unit 620 sets the correction write processing parameter variation in this track at the time of idle or in real time. Further, the access processing control unit 620 may hold each correction write processing parameter variation in each track in a particular storage area, for example, the system area 10*b* of the disk 10, the non-volatile memory 80, and the like.

For example, the access processing control unit 620 sets the recording density, the recording current, the heater setting value, the transfer speed, or the recording frequency in a particular track to a certain recording density as a reference (hereinafter, may be referred to as a reference recording density), a certain recording current as a reference (hereinafter, may be referred to as a reference recording current), a certain heater setting value as a reference (hereinafter, may be referred to as a reference heater setting value), a certain transfer speed as a reference (hereinafter, may be referred to as a reference transfer speed), or a certain recording frequency as a reference (hereinafter, may be referred to as a reference recording frequency), and measures the variation of the BER (hereinafter, may be referred to as am actual measurement BER variation) in this track. Based on the measured actual measurement BER variation of the track, the access processing control unit 620 calculates a variation of a change amount of the recording density (hereinafter, may be referred to as a recording density correction amount variation or a recording density change amount variation), a variation of a change amount of the recording current (hereinafter, may be referred to as a recording current correction amount variation or a recording current change amount variation), a variation of a change amount of the heater setting value (hereinafter, may be referred to as a heater setting value correction amount variation or a heater setting value change amount variation), a variation of a change amount of the transfer speed (hereinafter, may be referred to as a transfer speed correction amount variation or a transfer speed change amount variation), or a variation of a change amount of the recording frequency (hereinafter, may be referred to as a recording frequency correction amount variation or a recording frequency change amount variation) from the reference recording density, the reference recording current, the reference heater setting value, the reference transfer speed, or the reference recording frequency in the track for uniformly adjusting or suppressing the actual measurement BER variation of the track. The access processing control unit 620 adds (or subtracts) the recording density correction amount variation, the recording current correction amount variation, the heater setting value correction amount variation, the transfer speed correction amount variation, or the recording frequency correction amount variation to the reference recording density, the reference recording current, the reference heater setting value, the reference transfer speed, or the reference recording frequency in this track. Accordingly, the access processing control unit 620 corrects (or adjusts) the reference recording density, the reference recording current, the reference heater setting value, the reference transfer speed, or the reference recording frequency in this track to the recording density variation (hereinafter, may be referred to as a correction recording density variation), the recording current variation (hereinafter, may be referred to as a correction recording current variation), the heater setting value variation (hereinafter, may be referred to as a correction heater setting value variation), the transfer speed variation (hereinafter, may be referred to as a correction transfer speed variation), or the recording frequency variation (hereinafter, may be referred to as a correction recording frequency variation) in this track. The access processing control unit 620 sets the correction recording density variation, the correction recording current variation, the correction heater setting value variation, the correction transfer speed variation, or the correction recording frequency variation in this track. The access processing control unit 620 may hold the correction recording density variation, the correction recording current variation, the correction heater setting value variation, the correction transfer speed variation, or the correction recording frequency variation in each track in a particular storage area, for example, the system area 10*b* of the disk 10 and the non-volatile memory 80.

The access processing control unit 620 sets each write processing parameter of each circumferential position in a particular track to the reference write processing parameter as a reference, and measures each evaluation index (hereinafter, may be referred to as an actual measurement evaluation index) of each circumferential position of this track. Based on each measured actual measurement evaluation index of each circumferential position of this track, the access processing control unit 620 calculates a change amount (hereinafter, may be referred to as a write processing parameter correction amount or a write processing parameter change amount) of each write processing parameter of each circumferential position from each reference write processing parameter of each circumferential position of this track for uniformly adjusting or suppressing each actual measurement evaluation index of each circumferential position of this track. The access processing control unit 620 adds (or subtracts) each write processing parameter correction amount of each circumferential position to each reference write processing parameter of each circumferential position in this track. Accordingly, the access processing control unit 620 corrects (or adjusts) each reference write processing parameter of each circumferential position in the track to each write processing parameter (hereinafter, may be referred to as a correction write processing parameter) of each circumferential position. The access processing control unit 620 sets each correction write processing parameter corresponding to each circumferential position of the track. The access processing control unit 620 may hold each correction write processing parameter at each circumferential position of the particular track in a particular storage area, for example, the system area 10b of the disk 10, the non-volatile memory 80, and the like.

The evaluation index variation (or the actual measurement evaluation index variation) in the particular track includes each evaluation index (or the actual measurement evaluation index) of each circumferential position of the particular track. The write processing parameter correction amount variation in the particular track includes each write processing parameter correction amount of each circumferential position of the particular track. The write processing parameter variation in the particular track includes each write processing parameter of each circumferential position of the particular track. The correction write processing parameter variation in the particular track includes each correction write processing parameter of each circumferential position of the particular track.

For example, the access processing control unit 620 sets each recording density, each recording current, each heater setting value, each transfer speed, or each recording frequency of each circumferential position in a particular track to the reference recording density, the reference recording current, the reference heater setting value, the reference transfer speed, or the reference recording frequency, and measures each BER (hereinafter, may be referred to as an actual measurement BER) of each circumferential position of this track. Based on each measured actual measurement BER of each circumferential position of this track, the access processing control unit 620 calculates a change amount of each recording density of each circumferential position (hereinafter, may be referred to as a recording density correction amount or a recording density change amount), a change amount of each recording current (hereinafter, may be referred to as a recording current correction amount or a recording current change amount), a change amount of each heater setting value (hereinafter, may be referred to as a heater setting correction amount or a heater setting change amount), a change amount of each transfer speed (hereinafter, may be referred to as a transfer speed correction amount or a transfer speed change amount), or a change amount of each recording frequency (hereinafter, may be referred to as a recording frequency correction amount or a recording frequency change amount) from each reference recording density, each reference recording current, each reference heater setting value, each reference transfer speed, or each reference recording frequency in this track for uniformly adjusting or suppressing each measured actual measurement BER of each circumferential position of this track. The access processing control unit 620 adds (or subtracts) the recording density correction amount, the recording current correction amount, the heater setting correction amount, the transfer speed correction amount, or the recording frequency correction amount of each circumferential position to (or from) each reference recording density, each reference recording current, each reference heater setting value, each reference transfer speed, or each reference recording frequency of each circumferential position in the track. Accordingly, the access processing control unit 620 corrects (or adjusts) each reference recording density, each reference recording current, each reference heater setting value, each reference transfer speed, or each reference recording frequency of each circumferential position in this track to each recording density (hereinafter, may be referred to as a correction recording density), each recording current (hereinafter, may be referred to as a correction recording current), each heater setting value (hereinafter, may be referred to as a correction heater setting value), each transfer speed (hereinafter, may be referred to as a correction transfer speed), or each recording frequency (hereinafter, may be referred to as a correction recording frequency) of each circumferential position in this track. The access processing control unit 620 sets each correction recording density, each correction recording current, each correction heater setting value, each correction transfer speed, or each correction recording frequency corresponding to each circumferential position in the track. The access processing control unit 620 may hold each correction recording density, each correction recording current, each correction heater setting value, each correction transfer speed, or each correction recording frequency at each circumferential position of the particular track in a particular storage area, for example, the system area 10b of the disk 10, the non-volatile memory 80, or the like.

The BER variation (or the actual measurement BER variation) in the particular track includes each BER (or the actual measurement BER) of each circumferential position of the particular track. The recording density variation in the particular track includes each recording density of each circumferential position of the particular track. The recording density correction amount variation in the particular track includes each recording density correction amount of each circumferential position of the particular track. The correction recording density variation in the particular track includes each correction recording density of each circumferential position of the particular track. The recording current variation in the particular track includes each recording current of each circumferential position of the particular track. The recording current correction amount variation in the particular track includes each recording current correction amount of each circumferential position of the particular track. The correction recording current variation in the particular track includes each correction recording current of each circumferential position of the particular track. The heater setting value variation in the particular track includes each heater setting value of each circumferential position of the particular track. The heater setting value correction amount variation in the particular track includes each heater setting value correction amount of each circumferential position of the particular track. The correction heater setting value variation in the particular track includes each correction heater setting value of each circumferential position of the particular track. The transfer speed variation in the particular track includes each transfer speed of each circumferential position of the particular track. The transfer speed correction amount variation in the particular track includes each transfer speed correction amount of each circumferential position of the particular track. The correction transfer speed variation in the particular track includes each correction transfer speed of each circumferential position of the particular track. The recording frequency variation in the particular track includes each recording frequency of each circumferential position of the particular track. The recording frequency correction amount variation in the particular track includes each recording frequency correction amount of each circumferential position of the particular track. The correction recording frequency variation in the particular track includes each complementary recording frequency of each circumferential position of the particular track.

The access processing control unit 620 sets each write processing parameter of each segmented area in a particular track as the reference write processing parameter, and measures each actual measurement evaluation index of each segmented area of this track. Based on each measured actual measurement evaluation index of each segmented area of the track, the access processing control unit 620 calculates the write processing parameter correction amount of each segmented area from the reference write processing parameter of each segmented area of the track for uniformly adjusting or suppressing each actual measurement evaluation index of each segmented area of the track. The access processing control unit 620 adds (or subtracts) each write processing parameter correction amount of each segmented area to each reference write processing parameter of each segmented area in this track. Accordingly, the access processing control unit 620 corrects (or adjusts) each reference write processing parameter of each segmented area to each correction write processing parameter of each segmented area in this track. The access processing control unit 620 sets each correction write processing parameter corresponding to each segmented area of this track. The access processing control unit 620 may hold each correction write processing parameter in each segmented area of the particular track in a particular storage area, for example, the system area 10b of the disk 10, the non-volatile memory 80, or the like.

The evaluation index variation (or the actual measurement evaluation index variation) in the particular track includes each evaluation index (or the actual measurement evaluation index) of each segmented area of the particular track. The write processing parameter variation in the particular track includes each write processing parameter of each segmented area of the particular track. The write processing parameter correction amount variation in the particular track includes each write processing parameter correction amount of each segmented area of the particular track. The correction write processing parameter variation in the particular track includes each correction write processing parameter of each segmented area of the particular track.

For example, the access processing control unit 620 sets each recording density, each recording current, each heater setting value, each transfer speed, or each recording frequency of each segmented area in a particular track to the reference recording density, the reference recording current, the reference heater setting value, the reference transfer speed, or the reference recording frequency, and measures each BER (hereinafter, may be referred to as an actual measurement BER) of each segmented area of this track. Based on each measured actual measurement BER of each segmented area of the track, the access processing control unit 620 calculates each recording density correction amount, each recording current correction amount, each heater setting correction amount, each transfer speed correction amount, or each recording frequency correction amount of each segmented area from each reference recording density, each reference recording current, each reference heater setting value, each reference transfer speed, or each reference recording frequency of each segmented area in the track for uniformly adjusting or suppressing each actual measurement BER of each segmented area of the track. The access processing control unit 620 adds (or subtracts) the recording density correction amount, the recording current correction amount, the heater setting correction amount, the transfer speed correction amount, or the recording frequency correction amount of each segmented area to (or from) each reference recording density, each reference recording current, each reference heater setting value, each reference transfer speed, or each reference recording frequency of each segmented area in this track. Accordingly, the access processing control unit 620 corrects (or adjusts) each reference recording density, each reference recording current, each reference heater setting value, each reference transfer speed, or each reference recording frequency of each segmented area in this track to each correction recording density, each correction recording current, each correction heater setting value, each correction transfer speed, or each correction recording frequency of each segmented area in this track. The access processing control unit 620 sets each correction recording density, each correction recording current, each correction heater setting value, each correction transfer speed, or each correction recording frequency corresponding to each segmented area in this track. The access processing control unit 620 may hold each correction recording density, each correction recording current, each correction heater setting value, each correction transfer speed, or each correction recording frequency in each segmented area of the particular track in a particular storage area, for example, the system area 10b of the disk 10, the non-volatile memory 80, or the like.

The BER variation (or the actual measurement BER variation) in the particular track includes each BER (or the actual measurement BER) of each segmented area of the particular track. The recording density variation in the particular track includes each recording density of each segmented area of the particular track. The recording density correction amount variation in the particular track includes each recording density correction amount of each segmented area of the particular track. The correction recording density variation in the particular track includes each correction recording density of each segmented area of the particular track. The recording current variation in the particular track includes each recording current of each segmented area of the particular track. The recording current correction amount variation in the particular track includes each recording current correction amount of each segmented area of the particular track. The correction recording current variation in the particular track includes each correction recording current of each segmented area of the particular track. The heater setting value variation in the particular track includes each heater setting value of each segmented area of the particular track. The heater setting value correction amount variation in the particular track includes each heater setting value correction amount of each segmented area of the particular track. The correction heater setting value variation in the particular track includes each correction heater setting value of each segmented area of the particular track. The transfer speed variation in the particular track includes each transfer speed of each segmented area of the particular track. The transfer speed correction amount variation in the particular track includes each transfer speed correction amount of each segmented area of the particular track. The correction transfer speed variation in the particular track includes each correction transfer speed of each segmented area of the particular track. The recording frequency variation in the particular track includes each recording frequency of each segmented area of the particular track. The correction recording frequency variation in the particular track includes each complementary recording frequency of each segmented area of the particular track.

The access processing control unit 620 sets each write processing parameter of each sector in a particular track as the reference write processing parameter, and measures each actual measurement evaluation index of each sector of this track. Based on each measured actual measurement evaluation index of each sector of this track, the access processing control unit 620 calculates the write processing parameter correction amount of each sector from the reference write processing parameter of each sector of this track for uniformly adjusting or suppressing each actual measurement evaluation index of each sector of this track. The access processing control unit 620 adds (or subtracts) each write processing parameter correction amount of each sector to each reference write processing parameter of each sector in this track. Accordingly, the access processing control unit 620 corrects (or adjusts) each reference write processing parameter of each sector in this track to each write processing parameter (hereinafter, may be referred to as a correction write processing parameter) of each sector. The access processing control unit 620 sets each correction write processing parameter corresponding to each sector of this track. The access processing control unit 620 may hold each correction write processing parameter in each sector of the particular track in a particular storage area, for example, the system area 10b of the disk 10, the non-volatile memory 80, and the like.

The evaluation index variation (or the actual measurement evaluation index variation) in the particular track includes each evaluation index (actual measurement evaluation index) of each sector of the particular track. The write processing parameter variation in the particular track includes each write processing parameter of each sector of the particular track. The write processing parameter correction amount variation in the particular track includes each write processing parameter correction amount of each sector of the particular track. The correction write processing parameter variation in the particular track includes each correction write processing parameter of each sector of the particular track.

For example, the access processing control unit 620 sets each recording density, each recording current, each heater setting value, each transfer speed, or each recording frequency of each sector in a particular track to the reference recording density, the reference recording current, the reference heater setting value, the reference transfer speed, or the reference recording frequency, and measures each actual measurement BER of each sector of this track. Based on each measured actual measurement BER of each sector of this track, the access processing control unit 620 calculates each recording density correction amount, each recording current correction amount, each heater setting correction amount, each transfer speed correction amount, or each recording frequency correction amount of each sector from each reference recording density, each reference recording current, each reference heater setting value, each reference transfer speed, or each reference recording frequency of each sector in this track for uniformly correcting (or adjusting) each actual measurement BER of each sector of this track. The access processing control unit 620 adds (or subtracts) the recording density correction amount, the recording current correction amount, the heater setting correction amount, the transfer speed correction amount, or the recording frequency correction amount of each sector to (or from) each reference recording density, each reference recording current, each reference heater setting value, each reference transfer speed, or each reference recording frequency of each sector in this track. Accordingly, the access processing control unit 620 corrects (or adjusts) each reference recording density, each reference recording current, each reference heater setting value, each reference transfer speed, or each reference recording frequency of each sector in this track to each recording density (hereinafter, may be referred to as a correction recording density), each recording current (hereinafter, may be referred to as a correction recording current), each heater setting value (hereinafter, may be referred to as a correction heater setting value), each transfer speed (hereinafter, may be referred to as a correction transfer speed), or each recording frequency (hereinafter, may be referred to as a correction recording frequency) of each sector in this track. The access processing control unit 620 sets each correction recording density, each correction recording current, each correction heater setting value, each correction transfer speed, or each correction recording frequency corresponding to each sector in this track. The access processing control unit 620 may hold each correction recording density, each correction recording current, each correction heater setting value, each correction transfer speed, or each correction recording frequency in each sector of a particular track in a particular storage area, for example, the system area 10b of the disk 10, the non-volatile memory 80, or the like.

The BER variation (or the actual measurement BER variation) in the particular track includes each BER (or the actual measurement BER) of each sector of the particular track. The recording density variation in the particular track includes the recording density of each sector of the particular track. The recording density correction amount variation in the particular track includes the recording density correction amount of each sector of the particular track. The correction recording density variation in the particular track includes the correction recording density of each sector of the particular track. The recording current variation in the particular track includes each recording current of each sector of the particular track. The recording current correction amount variation in the particular track includes the recording current correction amount of each sector of the particular track. The correction recording current variation in the particular track includes each correction recording current of each sector of the particular track. The heater setting value variation in the particular track includes each heater setting value of each sector of the particular track. The heater setting value correction amount variation in the particular track includes the heater setting value correction amount of each sector of the particular track. The correction heater setting value variation in the particular track includes the correction heater setting value of each sector of the particular track. The transfer speed variation in the particular track includes each transfer speed of each sector of the particular track. The transfer speed correction amount variation in the particular track includes the transfer speed correction amount of each sector of the particular track. The correction transfer speed variation in the particular track includes each correction transfer speed of each sector of the particular track. The recording frequency variation in the particular track includes each recording frequency of each sector of the particular track. The recording frequency correction amount variation in the particular track includes the recording frequency correction amount of each sector of the particular track. The correction recording frequency variation in the particular track includes the complementary recording frequency of each sector of the particular track.

The access processing control unit 620 sets a write processing parameter in a particular track as the reference write processing parameter and measures the actual measurement evaluation index variation of the track. The access processing control unit 620 approximates the measured actual measurement evaluation index variation of this track and calculates the approximated actual measurement evaluation index variation (hereinafter, may be referred to as an approximate evaluation index variation) of this track. The access processing control unit 620 corrects (or adjusts) the calculated approximate evaluation index variation of this track and calculates the corrected (or adjusted) approximate evaluation index variation (hereinafter, may be referred to as a correction evaluation index variation) of this track. Based on the calculated correction evaluation index variation of the track, the access processing control unit 620 calculates a write processing parameter correction amount from the reference write processing parameter in the track for uniformly adjusting or suppressing the correction evaluation index variation in the track. The access processing control unit 620 adds (or subtracts) the write processing parameter correction amount variation to the reference write processing parameter in this track. Accordingly, the access processing control unit 620 corrects (or adjusts) the reference write processing parameter of this track to the correction write processing parameter variation of this track. The access processing control unit 620 sets the correction write processing parameter variation in this track. The access processing control unit 620 may hold the correction write processing parameter variation in the particular track in a particular storage area, for example, the system area 10b of the disk 10, the non-volatile memory 80, and the like.

Incidentally, the access processing control unit 620 sets a write processing parameter in a particular track as the reference write processing parameter at the time of idle or in real time, and measures the actual measurement evaluation index variation of this track. The access processing control unit 620 approximates the measured actual measurement evaluation index variation of this track at the time of idle or in real time, and calculates the approximated approximate evaluation index variation of this track. The access processing control unit 620 corrects (or adjusts) the calculated approximate evaluation index variation of this track at the time of idle or in real time, and calculates the corrected (or adjusted) correction evaluation index variation of this track. Based on the calculated correction evaluation index variation of the track at the time of idle or in real time, the access processing control unit 620 calculates a write processing parameter correction amount from the reference write processing parameter in the track for uniformly correcting (or adjusting) the correction evaluation index variation. The access processing control unit 620 adds (or subtracts) the write processing parameter correction amount variation to the reference write processing parameter in this track at the time of idle or in real time. Accordingly, the access processing control unit 620 corrects (or adjusts) the reference write processing parameter of this track to the correction write processing parameter variation of this track at the time of idle or in real time. The access processing control unit 620 sets the correction write processing parameter variation in this track at the time of idle or in real time. Further, the access processing control unit 620 may hold each correction write processing parameter variation in each track in a particular storage area, for example, the system area 10b of the disk 10, the non-volatile memory 80, and the like at the time of idle or in real time.

The access processing control unit 620 sets each recording density, each recording current, each heater setting value, each transfer speed, or each recording frequency in a particular track to the reference recording density, the reference recording current, the reference heater setting value, the reference transfer speed, or the reference recording frequency, and measures the actual measurement BER variation of this track. The access processing control unit 620 approximates the measured actual measurement BER variation of this track and calculates the approximated actual measurement BER variation (hereinafter, may be referred to as an approximate BER variation) of this track. The access processing control unit 620 corrects (or adjusts) the calculated approximate BER variation of this track and calculates the corrected (or adjusted) approximate BER variation (hereinafter, may be referred to as a correction BER variation) of this track. Based on the calculated correction BER variation of the track, the access processing control unit 620 calculates a recording density correction amount variation, a recording current correction amount variation, a heater setting value correction amount variation, a transfer speed correction amount variation, or a recording frequency correction amount variation from the reference recording density, the reference recording current, the reference heater setting value, the reference transfer speed, or the reference recording frequency in the track for uniformly adjusting or suppressing the correction BER variation of the track. The access processing control unit 620 adds (or subtracts) the recording density correction amount variation, the recording current correction amount variation, the heater setting value correction amount variation, the transfer speed correction amount variation, or the recording frequency correction amount variation to the reference recording density, the reference recording current, the reference heater setting value, the reference transfer speed, or the reference recording frequency in this track. Accordingly, the access processing control unit 620 corrects (or adjusts) the reference recording density, the reference recording current, the reference heater setting value, the reference transfer speed, or the reference recording frequency of this track to the correction recording density variation, the correction recording current variation, the correction heater setting value variation, the correction transfer speed variation, or the correction recording frequency variation of this track. The access processing control unit 620 sets the correction recording density variation, the correction recording current variation, the correction heater setting value variation, the correction transfer speed variation, or the correction recording frequency variation in this track. The access processing control unit 620 may hold the correction recording density variation, the correction recording current variation, the correction heater setting value variation, the correction transfer speed variation, or the correction recording frequency variation in each track in a particular storage area, for example, the system area 10b of the disk 10 and the non-volatile memory 80.

For example, the access processing control unit 620 sets a recording density in a particular track to the reference recording density, and measures the actual measurement BER variation of this track. The access processing control unit 620 approximates the measured actual measurement BER variation of this track and calculates the approximated approximate BER of each circumferential position of this track. The access processing control unit 620 corrects (or adjusts) the calculated approximate BER variation of this track and calculates the corrected (or adjusted) correction BER variation of this track. Based on the calculated correction BER variation in the track, the access processing control unit 620 calculates a recording density correction amount variation of the track from the reference recording density in the track for uniformly adjusting or suppressing the correction BER variation in the track. The access processing control unit 620 adds (or subtracts) each recording density correction amount of each circumferential position to the reference recording density of each circumferential position in the track. Accordingly, the access processing control unit 620 adds (or subtracts) the recording density correction amount variation of the track to the reference recording density of the track. Accordingly, the access processing control unit 620 corrects (or adjusts) the reference recording density of this track to the correction recording density variation of this track. The access processing control unit 620 calculates the variation of the time-based generator (TBG) value (hereinafter, may be referred to as a TBG value variation) corresponding to the variation of the recording frequency (correction recording frequency) proportional to the correction recording density variation in the track. The access processing control unit 620 sets the TBG value variation in this track. The access processing control unit 620 may hold the TBG value variation in the particular track in a particular storage area, for example, the system area 10*b* of the disk 10, the non-volatile memory 80, and the like.

The access processing control unit 620 sets each write processing parameter of each circumferential position in a particular track as the reference write processing parameter, and measures each actual measurement evaluation index of each circumferential position of this track. The access processing control unit 620 approximates each measured actual measurement evaluation index of each circumferential position of this track, and calculates each approximated approximate evaluation index of each circumferential position of this track. The access processing control unit 620 corrects (or adjusts) each calculated approximate evaluation index of each circumferential position of the track, and calculates each corrected (or adjusted) correction evaluation index of each circumferential position of the track. Based on each calculated correction evaluation index of each circumferential position of this track, the access processing control unit 620 calculates each write processing parameter correction amount of each circumferential position from the reference write processing parameter of each circumferential position in this track for uniformly adjusting or suppressing each correction evaluation index of each circumferential position of this track. The access processing control unit 620 adds (or subtracts) each write processing parameter correction amount of each circumferential position to the reference write processing parameter of each circumferential position in this track. Accordingly, the access processing control unit 620 corrects (or adjusts) the reference write processing parameter of each circumferential position in the track to each correction write processing parameter of each circumferential position. The access processing control unit 620 sets each correction write processing parameter corresponding to each circumferential position of the track. The access processing control unit 620 may hold each correction write processing parameter at each circumferential position of the particular track in a particular storage area, for example, the system area 10*b* of the disk 10, the non-volatile memory 80, and the like. The approximate evaluation index variation in the particular track includes each approximate evaluation index of each circumferential position of the particular track. The correction evaluation index variation in the particular track includes each correction evaluation index of each circumferential position of the particular track.

For example, the access processing control unit 620 sets each recording density, each recording current, each heater setting value, each transfer speed, or each recording frequency of each circumferential position in a particular track to the reference recording density, the reference recording current, the reference heater setting value, the reference transfer speed, or the reference recording frequency, and measures each actual measurement BER of each circumferential position of this track. The access processing control unit 620 approximates each measured actual measurement BER of each circumferential position of the track, and calculates each approximated approximate BER of each circumferential position of the track. The access processing control unit 620 corrects (or adjusts) each calculated approximate BER of each circumferential position of this track, and calculates each corrected (or adjusted) correction BER of each circumferential position of this track. Based on each calculated correction BER of each circumferential position of the track, the access processing control unit 620 calculates each recording density correction amount, each recording current correction amount, each heater setting correction amount, each transfer speed correction amount, or each recording frequency correction amount from the reference recording density, the reference recording current, the reference heater setting value, the reference transfer speed, or the reference recording frequency of each circumferential position of the track for uniformly adjusting or suppressing each correction BER of each circumferential position of the track. The access processing control unit 620 adds (or subtracts) each recording density correction amount, each recording current correction amount, each heater setting correction amount, each transfer speed correction amount, or each recording frequency correction amount of each circumferential position to the reference recording density, the reference recording current, the reference heater setting value, the reference transfer speed, or the reference recording frequency of each circumferential position in this track. Accordingly, the access processing control unit 620 corrects (or adjusts) the reference recording density, the reference recording current, the reference heater setting value, the reference transfer speed, or the reference recording frequency of each circumferential position in the track to each correction recording density, each correction recording current, each correction heater setting value, each correction transfer speed, or each correction recording frequency of each circumferential position in the track. The access processing control unit 620 sets each correction recording density, each correction recording current, each correction heater setting value, each correction transfer speed, or each correction recording frequency corresponding to each circumferential position in this track. The access processing control unit 620 may hold each correction recording density, each correction recording current, each correction heater setting value, each correction transfer speed, or each correction recording frequency at each circumferential position of the particular track in a particular storage area, for example, the system area 10*b* of the disk 10, the non-volatile memory 80, or the like.

The approximate BER variation in the particular track includes each approximate BER of each circumferential position of the particular track. The correction BER variation in the particular track includes each corrected BER of each circumferential position of the particular track.

For example, the access processing control unit 620 sets each recording density of each circumferential position in a particular track to the reference recording density, and measures each actual measurement BER of each circumferential position of this track. The access processing control unit 620 approximates each measured actual measurement BER of each circumferential position of the track, and calculates each approximated approximate BER of each circumferential position of the track. The access processing control unit 620 corrects (or adjusts) each calculated approximate BER of each circumferential position of this track, and calculates a corrected (or adjusted) correction BER of each circumferential position of this track. Based on each calculated correction BER of each circumferential position of this track, the access processing control unit 620 calculates each recording density correction amount of each circumferential position from the reference recording density of each circumferential position of this track for uniformly adjusting or suppressing each correction BER of each circumferential position of this track. The access processing control unit 620 adds (or subtracts) each recording density correction amount of each circumferential position to the reference recording density of each circumferential position in the track. Accordingly, the access processing control unit 620 corrects (or adjusts) the reference recording density of each circumferential position in the track to each correction recording density of each circumferential position. The access processing control unit 620 calculates each TBG value of each circumferential position corresponding to each recording frequency (correction recording frequency) of each circumferential position proportional to each correction recording density of each circumferential position in the track. The access processing control unit 620 sets each TBG value corresponding to each circumferential position of the track. The access processing control unit 620 may hold each TBG value at each circumferential position of a particular track in a particular storage area, for example, the system area 10b of the disk 10, the non-volatile memory 80, and the like.

The TBG value variation in the particular track includes each TBG value of each circumferential position of the particular track.

The access processing control unit 620 sets each write processing parameter of each segmented area in a particular track as the reference write processing parameter, and measures each actual measurement evaluation index of each segmented area of this track. The access processing control unit 620 approximates each measured actual measurement evaluation index of each segmented area of the track, and calculates each approximated approximate evaluation index of each segmented area of the track. The access processing control unit 620 corrects (or adjusts) each calculated approximate evaluation index of each segmented area of this track, and calculates each corrected (or adjusted) correction evaluation index of each segmented area of this track. Based on each calculated correction evaluation index of each segmented area of the track, the access processing control unit 620 calculates each write processing parameter correction amount of each segmented area from the reference write processing parameter of each segmented area in the track for uniformly adjusting or suppressing each correction evaluation index of each segmented area of the track. The access processing control unit 620 adds (or subtracts) each write processing parameter correction amount of each segmented area to the reference write processing parameter of each segmented area in this track. Accordingly, the access processing control unit 620 corrects (or adjusts) the reference write processing parameter of each segmented area in this track to each correction write processing parameter of each segmented area. The access processing control unit 620 sets each correction write processing parameter corresponding to each segmented area of this track. The access processing control unit 620 may hold each correction write processing parameter in each segmented area of the particular track in a particular storage area, for example, the system area 10b of the disk 10, the non-volatile memory 80, or the like.

The approximate evaluation index variation in the particular track includes each approximate evaluation index of each segmented area of the particular track. The correction evaluation index variation in the particular track includes each correction evaluation index of each segmented area of the particular track.

For example, the access processing control unit 620 sets each recording density, each recording current, each heater setting value, each transfer speed, or each recording frequency of each segmented area in a particular track to the reference recording density, the reference recording current, the reference heater setting value, the reference transfer speed, or the reference recording frequency, and measures each actual measurement BER of each segmented area of this track. The access processing control unit 620 approximates each measured actual measurement BER of each segmented area of the track, and calculates each approximated approximate BER of each segmented area of the track. The access processing control unit 620 corrects (or adjusts) each calculated approximate BER of each segmented area of the track, and calculates each corrected (or adjusted) correction BER of each segmented area of the track. Based on each calculated correction BER of each segmented area of the track, the access processing control unit 620 calculates each recording density correction amount, each recording current correction amount, each heater setting correction amount, each transfer speed correction amount, or each recording frequency correction amount from the reference recording density, the reference recording current, the reference heater setting value, the reference transfer speed, or the reference recording frequency of each segmented area of the track for uniformly adjusting or suppressing each correction BER of each segmented area of the track. The access processing control unit 620 adds (or subtracts) each recording density correction amount, each recording current correction amount, each heater setting correction amount, each transfer speed correction amount, or each recording frequency correction amount of each segmented area to the reference recording density, the reference recording current, the reference heater setting value, the reference transfer speed, or the reference recording frequency of each segmented area in this track. Accordingly, the access processing control unit 620 corrects (or adjusts) the reference recording density, the reference recording current, the reference heater setting value, the reference transfer speed, or the reference recording frequency of each segmented area in this track to each correction recording density, each correction recording current, each correction heater setting value, each correction transfer speed, or each correction recording frequency of each segmented area in this track. The access processing control unit 620 sets each correction recording density, each correction recording current, each correction heater setting value, each correction transfer speed, or each correction recording frequency corresponding to each circumferential position in this track. The access processing control unit 620 may hold each correction recording density, each correction recording current, each correction heater setting value, each correction transfer speed, or each correction recording frequency in each segmented area of the particular track in a particular storage area, for example, the system area 10b of the disk 10, the non-volatile memory 80, or the like.

The approximate BER variation in the particular track includes each approximate BER of each circumferential position of the particular track. The correction BER variation in the particular track includes each corrected BER of each circumferential position of the particular track.

For example, the access processing control unit 620 sets each recording density of each segmented area in a particular track to the reference recording density, and measures each actual measurement BER of each segmented area of this track. The access processing control unit 620 approximates each measured actual measurement BER of each segmented area of the track, and calculates each approximated approximate BER of each segmented area of the track. The access processing control unit 620 corrects (or adjusts) each calculated approximate BER of each segmented area of the track, and calculates the corrected (or adjusted) correction BER of each segmented area of the track. Based on each calculated correction BER of each segmented area of the track, the access processing control unit 620 calculates each recording density correction amount of each segmented area from the reference recording density of each segmented area of the track for uniformly adjusting or suppressing each correction BER of each segmented area of the track. The access processing control unit 620 adds (or subtracts) each recording density correction amount of each segmented area to the reference recording density of each segmented area in this track. Accordingly, the access processing control unit 620 corrects (or adjusts) the reference recording density of each segmented area in the track to each correction recording density of each segmented area. The access processing control unit 620 calculates each TBG value of each segmented area corresponding to each recording frequency (correction recording frequency) of each segmented area proportional to each correction recording density of each segmented area in this track. The access processing control unit 620 sets each TBG value corresponding to each segmented area of this track. The access processing control unit 620 may hold each TBG value in each segmented area of a particular track in a particular storage area, for example, the system area 10b of the disk 10, the non-volatile memory 80, and the like.

The TBG value variation in the particular track includes each TBG value of each segmented area of the particular track.

The access processing control unit 620 sets each write processing parameter of each sector in a particular track as the reference write processing parameter, and measures each actual measurement evaluation index of each sector of this track. The access processing control unit 620 approximates each measured actual measurement evaluation index of each sector of this track, and calculates the approximated approximate evaluation index of each sector of this track. The access processing control unit 620 corrects (or adjusts) each calculated approximate evaluation index of each sector of this track, and calculates each corrected (or adjusted) correction evaluation index of each sector of this track. Based on each calculated correction evaluation index of each sector of this track, the access processing control unit 620 calculates the write processing parameter correction amount of each sector from the reference write processing parameter of each sector of this track for uniformly adjusting or suppressing each correction evaluation index of each sector of this track. The access processing control unit 620 adds (or subtracts) each write processing parameter correction amount of each sector to the reference write processing parameter of each sector in this track. Accordingly, the access processing control unit 620 corrects (or adjusts) the reference write processing parameter of each sector in this track to each correction write processing parameter of each sector. The access processing control unit 620 sets each correction write processing parameter corresponding to each sector of this track. The access processing control unit 620 may hold each correction write processing parameter in each sector of the particular track in a particular storage area, for example, the system area 10b of the disk 10, the non-volatile memory 80, and the like.

The approximate evaluation index variation in the particular track includes each approximate evaluation index of each sector of the particular track. The correction evaluation index variation in the particular track includes each correction evaluation index of each sector of the particular track.

For example, the access processing control unit 620 sets each recording density, each recording current, each heater setting value, each transfer speed, or each recording frequency of each sector in a particular track to the reference recording density, the reference recording current, the reference heater setting value, the reference transfer speed, or the reference recording frequency, and measures each actual measurement BER of each sector of this track. The access processing control unit 620 approximates each measured actual measurement BER of each sector of the track and calculates the approximated approximate BER of each sector of the track. The access processing control unit 620 corrects (or adjusts) each calculated approximate BER of each sector of the track, and calculates the corrected (or adjusted) correction BER of each sector of the track. Based on the calculated correction BER of each sector of this track, the access processing control unit 620 calculates each recording density correction amount, each recording current correction amount, each heater setting correction amount, each transfer speed correction amount, or each recording frequency correction amount from the reference recording density, the reference recording current, the reference heater setting value, the reference transfer speed, or the reference recording frequency of each sector of this track for uniformly adjusting or suppressing each correction BER of each sector of this track. The access processing control unit 620 adds (or subtracts) each recording density correction amount, each recording current correction amount, each heater setting correction amount, each transfer speed correction amount, or each recording frequency correction amount of each sector to the reference recording density, the reference recording current, the reference heater setting value, the reference transfer speed, or the reference recording frequency of each sector in this track. Accordingly, the access processing control unit 620 corrects (or adjusts) the reference recording density, the reference recording current, the reference heater setting value, the reference transfer speed, or the reference recording frequency of each sector in the track to the correction recording density, the correction recording current, the correction heater setting value, the correction transfer speed, or the correction recording frequency of each sector in this track. The access processing control unit 620 sets each correction recording density, each correction recording current, each correction heater setting value, each correction transfer speed, or each correction recording frequency corresponding to each sector of this track. The access processing control unit 620 may hold each correction recording density, each correction recording current, each correction heater setting value, each correction transfer speed, or each correction recording frequency in each sector of a particular track in a particular storage area, for example, the system area 10b of the disk 10, the non-volatile memory 80, or the like.

The approximate BER variation in the particular track includes each approximate BER of each sector of the particular track. The correction BER variation in the particular track includes each correction BER of each sector of the particular track.

For example, the access processing control unit 620 sets each recording density of each sector in a particular track to the reference recording density, and measures each actual measurement BER of each sector in this track. The access processing control unit 620 approximates each measured actual measurement BER of each sector of the track and calculates the approximated approximate BER of each sector of the track. The access processing control unit 620 corrects (or adjusts) the calculated approximate BER of each sector of the track, and calculates the corrected (or adjusted) correction BER of each sector of the track. Based on each calculated correction BER of each sector in this track, the access processing control unit 620 calculates each recording density correction amount of each sector from the reference recording density of each sector of this track for uniformly adjusting or suppressing each correction BER of each sector of this track. The access processing control unit 620 adds (or subtracts) each recording density correction amount of each sector to the reference recording density of each sector in this track. Accordingly, the access processing control unit 620 corrects (or adjusts) the reference recording density of each sector in this track to the correction recording density of each sector. The access processing control unit 620 calculates each TBG value of each sector corresponding to each recording frequency (correction recording frequency) of each sector proportional to each correction recording density of each sector in this track. The access processing control unit 620 sets each TBG value corresponding to each sector of this track. The access processing control unit 620 may hold each TBG value in each sector of a particular track in a particular storage area, for example, the system area 10*b* of the disk 10, the non-volatile memory 80, and the like.

The TBG value variation in the particular track includes each TBG value of each sector of the particular track.

The access processing control unit 620 sets each write processing parameter of each circumferential position in a particular track as the reference write processing parameter, and measures each actual measurement evaluation index of each circumferential position of this track. The access processing control unit 620 approximates each measured actual measurement evaluation index of each circumferential position of this track, and calculates each approximated approximate evaluation index of each circumferential position of this track. The access processing control unit 620 corrects (or adjusts) each calculated approximate evaluation index of each circumferential position of this track, and calculates each (or adjusted) correction evaluation index of each segmented area of this track. Based on each calculated correction evaluation index of each segmented area of the track, the access processing control unit 620 calculates each write processing parameter correction amount of each segmented area from the reference write processing parameter of each segmented area in the track for uniformly adjusting or suppressing each correction evaluation index of each segmented area of the track. The access processing control unit 620 adds (or subtracts) each write processing parameter correction amount of each segmented area to the reference write processing parameter of each segmented area in this track. Accordingly, the access processing control unit 620 corrects (or adjusts) the reference write processing parameter of each segmented area in this track to each correction write processing parameter of each segmented area. The access processing control unit 620 sets each correction write processing parameter corresponding to each segmented area of this track. The access processing control unit 620 may hold each correction write processing parameter in each segmented area of the particular track in a particular storage area, for example, the system area 10*b* of the disk 10, the non-volatile memory 80, or the like.

For example, the access processing control unit 620 sets each recording density, each recording current, each heater setting value, each transfer speed, or each recording frequency of each circumferential position in a particular track to the reference recording density, the reference recording current, the reference heater setting value, the reference transfer speed, or the reference recording frequency, and measures each actual measurement BER of each circumferential position of this track. The access processing control unit 620 approximates each measured actual measurement BER of each circumferential position of the track, and calculates each approximated approximate BER of each circumferential position of the track. The access processing control unit 620 corrects (or adjusts) each calculated approximate BER of each circumferential position of the track, and calculates each corrected (or adjusted) correction BER of each segmented area of the track. Based on each calculated correction BER of each segmented area of the track, the access processing control unit 620 calculates each recording density correction amount, each recording current correction amount, each heater setting correction amount, each transfer speed correction amount, or each recording frequency correction amount from the reference recording density, the reference recording current, the reference heater setting value, the reference transfer speed, or the reference recording frequency of each segmented area in the track for uniformly adjusting or suppressing each correction BER of each segmented area of the track. The access processing control unit 620 adds (or subtracts) each recording density correction amount, each recording current correction amount, each heater setting correction amount, each transfer speed correction amount, or each recording frequency correction amount of each segmented area to the reference recording density, the reference recording current, the reference heater setting value, the reference transfer speed, or the reference recording frequency of each segmented area in this track. Accordingly, the access processing control unit 620 corrects (or adjusts) the reference recording density, the reference recording current, the reference heater setting value, the reference transfer speed, or the reference recording frequency of each segmented area in the track to each correction recording density, each correction recording current, each correction heater setting value, each correction transfer speed, or each correction recording frequency of each segmented area. The access processing control unit 620 sets each correction recording density, each correction recording current, each correction heater setting value, each correction transfer speed, or each correction recording frequency corresponding to each segmented area of this track. The access processing control unit 620 may hold each correction recording density, each correction recording current, each correction heater setting value, each correction transfer speed, or each correction recording frequency in each segmented area of the particular track in a particular storage area, for example, the system area 10*b* of the disk 10, the non-volatile memory 80, or the like.

For example, the access processing control unit 620 sets each recording density of each circumferential position in a particular track to the reference recording density, and measures each actual measurement BER of each circumferential position of this track. The access processing control unit 620 approximates each measured actual measurement BER of each circumferential position of the track, and calculates each approximated approximate BER of each circumferential position of the track. The access processing control unit 620 corrects (or adjusts) each calculated approximate BER of each circumferential position of the track, and calculates each corrected (or adjusted) correction BER of each segmented area of the track. Based on each calculated correction BER of each segmented area of the track, the access processing control unit 620 calculates each recording density correction amount of each segmented area from the reference recording density of each segmented area of the track for uniformly adjusting or suppressing each correction BER of each segmented area of the track. The access processing control unit 620 adds (or subtracts) each recording density correction amount of each segmented area to the reference recording density of each segmented area in this track. Accordingly, the access processing control unit 620 corrects (or adjusts) the reference recording density of each segmented area in the track to each correction recording density of each segmented area. The access processing control unit 620 calculates each TBG value of each segmented area in this track. The access processing control unit 620 sets each TBG value corresponding to each segmented area in this track. The access processing control unit 620 may hold each TBG value in each segmented area of a particular track in a particular storage area, for example, the system area 10b of the disk 10, the non-volatile memory 80, and the like.

FIG. 5 is a schematic diagram illustrating an example of an actual measurement evaluation index variation MBL5, an approximate evaluation index variation ABL5, and a correction evaluation index variation CBL5 with respect to a circumferential position of a particular track. In FIG. 5, the vertical axis represents a BER, and the horizontal axis represents a circumferential position. On the vertical axis of FIG. 5, the BER increases toward the tip side of an arrow and decreases toward the side opposite to the tip side of the arrow. The circumferential position on the horizontal axis in FIG. 5 includes a circumferential position (hereinafter, may be referred to as a start position) at which writing of data starts in a particular track and a circumferential position (hereinafter, may be referred to as an end position) at which writing of data ends in the particular track. The start position and the end position may coincide in the circumferential direction of the particular track, or may be different in the circumferential direction of the particular track. FIG. 5 illustrates a measured actual measurement evaluation index variation with respect to a circumferential position in a particular track (hereinafter, may be simply referred to as an actual measurement evaluation index variation), for example, the actual measurement BER variation MBL5 with respect to the circumferential position (hereinafter, may be simply referred to as an actual measurement BER variation), an approximate evaluation index variation with respect to the circumferential position in the particular track (hereinafter, may be simply referred to as an approximate evaluation index variation), for example, the approximate BER variation ABL5 with respect to the circumferential position (hereinafter, may be simply referred to as an approximate BER variation), and a correction evaluation index variation with respect to the circumferential position in the particular track (hereinafter, may be simply referred to as a correction evaluation index variation), for example, the correction BER variation CBL5 with respect to the circumferential position (hereinafter, may be simply referred to as a correction BER variation). Further, the maximum value (Max) and the average value (Ave) of the actual measurement BER variation, the maximum value (Max) and the average value (Ave) of the approximate BER variation, and the maximum value (Max) and the average value (Ave) of the correction BER variation are illustrated on the tip side of the horizontal axis in FIG. 5.

In the example illustrated in FIG. 5, the access processing control unit 620 sets each recording density of each circumferential position in a particular track, for example, a track currently being accessed (hereinafter, may be referred to as on-track) as the reference recording density, measures each actual measurement BER of each circumferential position of the on-track, and acquires the actual measurement BER variation MBL5 of the on-track.

The access processing control unit 620 approximates each measured actual measurement BER of each circumferential position of the on-track by Expression (1) described below, calculates each approximated approximate BER of each circumferential position of the on-track, and acquires the approximate BER variation ABL5 of the on-track.

$$ya = a \times \cos(px1 + b) + ca \quad (1)$$

Here, ya is an approximate BER, p is a coefficient, x1 is an actual measurement BER, a is a coefficient, b is a coefficient, and ca corresponds to a variation average value of the approximate BER variation ABL5 of a particular track.

The access processing control unit 620 corrects (or adjusts) each approximate BER of each circumferential position of the on-track calculated by Expression (2) described below, calculates each corrected (or adjusted) correction BER of each circumferential position of the on-track, and acquires the correction BER variation CBL5 of the on-track.

$$yc = x + cv \quad (2)$$

Here, yc is a correction BER, and cv is a correction amount. The correction amount cv can be calculated by Expression (3) described below.

$$cv = x2 - ca \quad (3)$$

Here, x2 is an approximate BER.

Figure 6:
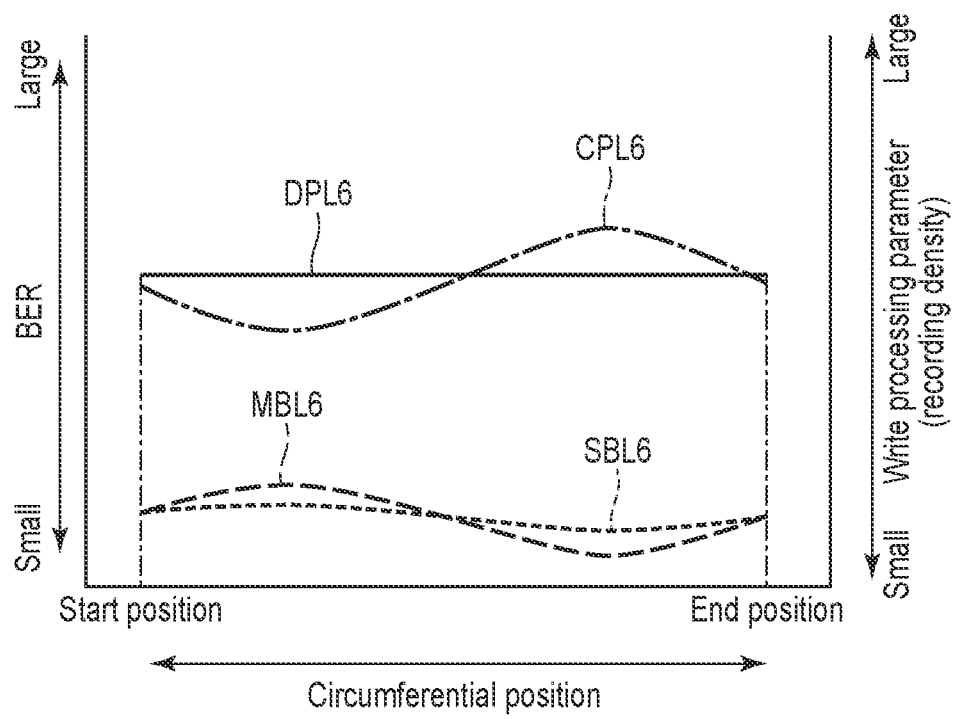
FIG. 6 is a schematic diagram illustrating an example of the correction evaluation index variation and a correction write processing parameter variation with respect to the circumferential position according to this embodiment.

FIG. 6 is a schematic diagram illustrating an example of the correction evaluation index variation CBL6 and the correction write processing parameter variation CPL6 with respect to the circumferential position according to this embodiment. In FIG. 6, the vertical axis represents a BER and a write processing parameter, and the horizontal axis represents a circumferential position. In FIG. 6, the BER increases toward the tip side of an arrow of "large" and decreases toward the tip side of an arrow of "small". In FIG. 6, the write processing parameter increases toward the tip side of an arrow of "large" and decreases toward the tip side of an arrow of "small". The circumferential position on the horizontal axis in FIG. 6 includes a start position and an end position. FIG. 6 illustrates a reference write processing parameter, for example, the reference recording density DPL6, a correction write processing parameter variation with respect to a circumferential position (hereinafter, may be simply referred to as a correction write processing parameter variation), for example, the correction recording density variation CPL6 with respect to the circumferential position (hereinafter, may be simply referred to as a correction recording density variation), a correction evaluation index (or actual measurement evaluation index) variation with respect to the circumferential position (hereinafter, may be simply referred to as a correction evaluation index (or actual measurement evaluation index) variation), for example, the correction BER (or actual measurement BER) variation MBL6 with respect to the circumferential position (hereinafter, may be simply referred to as a correction BER (or actual measurement BER) variation), and an evaluation index variation with respect to the circumferential position corresponding to the correction write processing parameter variation (hereinafter, may be referred to as a suppression evaluation index variation), for example, the actual measurement BER variation SBL6 with respect to the circumferential position corresponding to the correction recording density variation CPL6 (hereinafter, may be referred to as a suppression BER variation).

In the example illustrated in FIG. 6, the access processing control unit 620 sets a recording density in an on-track to the reference recording density, and measures the actual measurement BER variation MBL6 in the on-track. Based on the measured actual measurement BER variation MBL6 of the on-track, the access processing control unit 620 calculates a recording density correction amount variation in the on-track for uniformly adjusting or suppressing the actual measurement BER variation MBL6 of the on-track. The access processing control unit 620 adds (or subtracts) the recording density correction amount variation to the reference recording density in the on-track. Accordingly, the access processing control unit 620 corrects (or adjusts) the reference recording density DPL6 in the on-track to the correction recording density variation CPL6 in the on-track. The access processing control unit 620 sets the correction recording density variation CPL6 in the on-track. As illustrated in FIG. 6, by setting the correction recording density variation CPL6 in the on-track, the actual measurement BER variation MBL6 is suppressed to the suppression BER variation SBL6.

In the example illustrated in FIG. 6, the access processing control unit 620 sets each recording density in the on-track to the reference recording density DPL6 and measures the actual measurement BER variation of the on-track. The access processing control unit 620 approximates the measured actual measurement BER variation of the on-track and calculates the approximated approximate BER variation of the on-track. The access processing control unit 620 corrects (or adjusts) the calculated approximate BER variation of the on-track and calculates the corrected (or adjusted) correction BER variation MBL6 of the on-track. Based on the calculated correction BER variation MBL6 of the on-track, the access processing control unit 620 calculates a recording density correction amount variation for uniformly adjusting or suppressing the correction BER variation MBL6 in the on-track. The access processing control unit 620 adds (or subtracts) the recording density correction amount variation to the reference recording density in the on-track. Accordingly, the access processing control unit 620 corrects (or adjusts) the reference recording density of the on-track to the correction recording density variation CPL6 of the on-track. The access processing control unit 620 sets the correction recording density variation CPL6 in the on-track. As illustrated in FIG. 6, by setting the correction recording density variation CPL6 in the on-track, the correction BER variation MBL6 is suppressed to the suppression BER variation SBL6.

Figure 7:
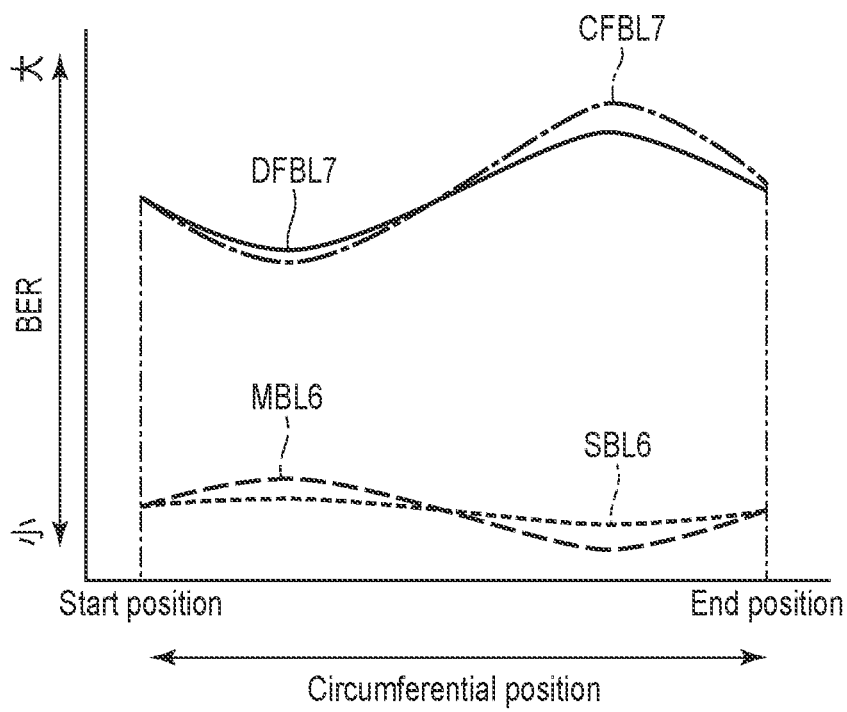
FIG. 7 is a schematic diagram illustrating an example of a BER variation with respect to the circumferential position of the particular track in a case where fringe writing is performed.

FIG. 7 is a schematic diagram illustrating an example of the BER variation with respect to the circumferential position of a particular track in a case where fringe writing is performed. In FIG. 7, the vertical axis represents a BER, and the horizontal axis represents a circumferential position. In FIG. 7, the BER increases toward the tip side of an arrow of "large" and decreases toward the tip side of an arrow of "small". The circumferential position on the horizontal axis in FIG. 7 includes a start position and an end position. FIG. 7 illustrates a correction evaluation index (or actual measurement evaluation index) variation, for example, the correction BER (or actual measurement BER) variation MBL6, and a suppression evaluation index variation, for example, the suppression BER variation SBL6. In addition, FIG. 7 illustrates an evaluation index variation, which includes the correction evaluation index (or actual measurement evaluation index) variation such as the correction BER (or actual measurement BER) variation MBL6, with respect to the circumferential position of the on-track in a case where fringe writing is performed on the on-track (hereinafter, may be simply referred to as an initial fringe evaluation index variation), for example, the BER variation DFBL7 with respect to the circumferential position (hereinafter, may be referred to as an initial fringe BER variation), and an evaluation index variation, which includes the suppression evaluation index variation such as the suppression BER variation SBL6, with respect to the circumferential position of the on-track in a case where fringe writing is performed on the on-track (hereinafter, may be simply referred to as a post-correction fringe evaluation index variation), for example, the BER variation CFBL7 with respect to the circumferential position (hereinafter, may be simply referred to as a post-correction fringe BER variation).

In the example illustrated in FIG. 7, when the reference recording density DPL6 is set in the on-track, the access processing control unit 620 measures the actual measurement BER variation MBL6 in the on-track. When fringe writing is performed on the adjacent track of the on-track having the actual measurement BER variation MBL6, the access processing control unit 620 measures the initial fringe BER variation DFBL7.

In the example illustrated in FIG. 7, when the correction recording density variation CPL6 is set in the on-track, the access processing control unit 620 measures the suppression BER variation SBL6 in the on-track. When writing is performed on the adjacent track of the on-track having the suppression BER variation SBL6, the access processing control unit 620 measures the post-correction fringe BER variation CFBL7.

As illustrated in FIG. 7, the change amount in the post-correction fringe BER variation CFBL7 is larger than the change amount in the initial fringe BER variation DFBL7. In the example illustrated in FIG. 7, a part of the post-correction fringe BER variation CFBL7 is larger than a part of the initial fringe BER variation DFBL7, and a part of the post-correction fringe BER variation CFBL7 is smaller than a part of the initial fringe BER variation DFBL7. Therefore, compared with a case where writing is performed on the adjacent track of the on-track of the actual measurement BER variation MBL6, in a case where writing is performed on the adjacent track of the on-track of the suppression BER variation SBL6, the influence (adjacent track interference: ATI) of the leakage magnetic flux or the like from the head 15 in a particular area of the on-track is larger and the ATI from the head 15 in another area of the on-track is smaller. In other words, compared with a case where writing is performed on the adjacent track of the on-track having the suppression BER variation SBL6, in a case where writing is performed on the adjacent track of the track having the actual measurement BER variation MBL6, there is a possibility that the data of the particular area of the on-track is likely to deteriorate and the data of another area of the on-track is unlikely to deteriorate. That is, compared with a case where data is written in the adjacent track of the on-track in which correction is made to the correction write processing parameter, in a case where data is written in the adjacent track of the on-track in which correction is not made, there is a possibility that data in a particular area of the on-track is likely to deteriorate and data in another area of the on-track is unlikely to deteriorate. In other words, compared with a case where data is written in the adjacent track of the on-track in which correction is made to the correction write processing parameter, in a case where data is written to the adjacent track of the on-track in which correction is not made, there is a possibility that data in a particular area of the on-track is likely to deteriorate.

The refresh control unit 630 counts the number of times at which data is written (hereinafter, may be referred to as a write number). The refresh control unit 630 counts the write number (hereinafter, may be referred to as a proximity area write number) at which data is written in an area (hereinafter, may be referred to as a proximity area) positioned within a particular range in the radial direction from a targeted area (hereinafter, may be referred to as a target area). For example, the refresh control unit 630 counts the proximity area write number (hereinafter, may be referred to as an outward proximity area write number or an outward write number) at which data is written in a proximity area (hereinafter, may be referred to as an outward proximity area) positioned within a particular range in the outer direction from the target area. Further, for example, the refresh control unit 630 counts the proximity area write number (hereinafter, may be referred to as an inward proximity area write number or an inward write number) at which data is written in a proximity area (hereinafter, may be referred to as an inward proximity area) positioned within a particular range in the inner direction from the target area. The refresh control unit 630 may hold the write number as a table in a particular recording area, for example, the system area 10b of the disk 10, the volatile memory 70, the non-volatile memory 80, the buffer memory 90, or the like.

When data is written in a proximity area positioned within a particular range in the radial direction from the target area, the refresh control unit 630 increases (increments) the proximity area write number by a particular value. For example, when data is written in the proximity area positioned within the particular range in the radial direction from the target area, the refresh control unit 630 increases (increments) the proximity area write number by one. When data is written in the outward proximity area, the refresh control unit 630 increases (increments) the outward proximity area write number (outward write number) by a particular value. For example, when data is written in the outward proximity area, the refresh control unit 630 increases (increments) the outward proximity area write number (outward write number) by one. When data is written in the inward proximity area, the refresh control unit 630 increases (increments) the inward proximity area write number (inward write number) by a particular value. For example, when data is written in the inward proximity area, the refresh control unit 630 increases (increments) the inward proximity area write number (inward write number) by one.

The refresh control unit 630 counts the write number (hereinafter, may be referred to as an adjacent area write number) at which data is written in an area (hereinafter, may be referred to as an adjacent area) radially adjacent to the target area. For example, the refresh control unit 630 counts the adjacent area write number (hereinafter, may be referred to as an outward adjacent area write number or an outward write number) at which data is written to an adjacent area (hereinafter, may be referred to as an outward adjacent area) adjacent to the outer side of the target area. In addition, for example, the refresh control unit 630 counts the adjacent area write number (hereinafter, may be referred to as an inward adjacent area write number or an inward write number) at which data is written to an adjacent area (hereinafter, may be referred to as an inward adjacent area) adjacent to the inner side of the target area.

When data is written in an adjacent area positioned on the radial side of the target area, the refresh control unit 630 increases (increments) the adjacent area write number by a particular value. For example, when data is written in the adjacent area positioned on the radial side of the target area, the refresh control unit 630 increases (increments) the adjacent area write number by one. When data is written in the outward adjacent area, the refresh control unit 630 increases (increments) the outward adjacent area write number (outward write number) by a particular value. For example, when data is written in the outward adjacent area, the refresh control unit 630 increases (increments) the outward adjacent area write number (outward write number) by one. When data is written in the inward adjacent area, the refresh control unit 630 increases (increments) the inward adjacent area write number (inward write number) by a particular value. For example, when data is written in the inward adjacent area, the refresh control unit 630 increases (increments) the inward adjacent area write number (inward write number) by one.

The refresh control unit 630 counts the write number (hereinafter, may be referred to as a proximity segmented area write number) at which data is written in a segmented area (hereinafter, may be referred to as a proximity segmented area) positioned within a particular range in the radial direction from a targeted segmented area (hereinafter, may be referred to as a target segmented area). For example, the refresh control unit 630 counts the proximity segmented area write number (hereinafter, may be referred to as an outward proximity segmented area write number or an outward write number) at which data is written in a proximity segmented area (hereinafter, may be referred to as an outward proximity segmented area) positioned within a particular range in the outer direction from the target segmented area. In addition, for example, the refresh control unit 630 counts the proximity segmented area write number (hereinafter, may be referred to as an inward proximity segmented area write number or an inward write number) at which data is written in a proximity segmented area (hereinafter, may be referred to as an inward proximity segmented area) positioned within a particular range in the inner direction from the target segmented area.

When data is written in a proximity segmented area positioned within a particular range in the radial direction from the target segmented area, the refresh control unit 630 increases (increments) the proximity segmented area write number by a particular value. For example, when data is written in the proximity segmented area positioned within the particular range in the radial direction from the target segmented area, the refresh control unit 630 increases (increments) the proximity segmented area write number by one. When data is written in the outward proximity segmented area, the refresh control unit 630 increases (increments) the outward proximity segmented area write number (outward write number) by a particular value. For example, when data is written in the outward proximity segmented area, the refresh control unit 630 increases (increments) the outward proximity segmented area write number (outward write number) by one. When data is written in the inward proximity segmented area, the refresh control unit 630 increases (increments) the inward proximity segmented area write number (inward write number) by a particular value. For example, when data is written in the inward proximity segmented area, the refresh control unit 630 increases (increments) the inward proximity segmented area write number (inward write number) by one.

The refresh control unit 630 counts the write number (hereinafter, may be referred to as an adjacent segmented area write number) at which data is written in a segmented area (hereinafter, may be referred to as an adjacent segmented area) radially adjacent to the target segmented area. For example, the refresh control unit 630 counts the adjacent segmented area write number (hereinafter, may be referred to as an outward adjacent segmented area write number or an outward write number) at which data is written to an adjacent segmented area (hereinafter, may be referred to as an outward adjacent segmented area) adjacent to the outer side of the target segmented area. In addition, for example, the refresh control unit 630 counts the adjacent segmented area write number (hereinafter, may be referred to as an inward adjacent segmented area write number or an inward write number) at which data is written to an adjacent segmented area (hereinafter, may be referred to as an inward adjacent segmented area) adjacent to the inner side of the target segmented area.

When data is written in an adjacent segmented area positioned on the radial side of the target segmented area, the refresh control unit 630 increases (increments) the adjacent segmented area write number by a particular value. For example, when data is written in the adjacent segmented area positioned on the radial side of the target segmented area, the refresh control unit 630 increases (increments) the adjacent segmented area write number by one. When data is written in the outward adjacent segmented area, the refresh control unit 630 increases (increments) the outward adjacent segmented area write number (outward write number) by a particular value. For example, when data is written in the outward adjacent segmented area, the refresh control unit 630 increases (increments) the outward adjacent segmented area write number (outward write number) by one. When data is written in the inward adjacent segmented area, the refresh control unit 630 increases (increments) the inward adjacent segmented area write number (inward write number) by a particular value. For example, when data is written in the inward adjacent segmented area, the refresh control unit 630 increases (increments) the inward adjacent segmented area write number (inward write number) by one.

The refresh control unit 630 counts the write number (hereinafter, may be referred to as a proximity sector write number) at which data is written in a sector (hereinafter, may be referred to as a proximity sector) positioned within a particular range in the radial direction from a targeted sector (hereinafter, may be referred to as a target sector). For example, the refresh control unit 630 counts the proximity sector write number (hereinafter, may be referred to as an outward proximity sector write number or an outward write number) in which data is written in a proximity sector (hereinafter, may be referred to as an outward proximity sector) positioned within a particular range in the outer direction from the target sector. Further, for example, the refresh control unit 630 counts the proximity sector write number (hereinafter, may be referred to as an inward proximity sector write number or an inward write number) at which data is written in a proximity sector (hereinafter, may be referred to as an inward proximity sector) positioned within a particular range in the inner direction from the target sector. Incidentally, a sector having an influence such as a write blur or a leakage magnetic field on a target area when data is written may be detected by measurement at a manufacturing stage, and the detected sector may be set as a proximity sector. In addition, a sector having an influence such as a write blur or a leakage magnetic field on a target area when data is written may be detected during operation processing, and the detected sector may be set as a proximity sector.

When data is written in a proximity sector positioned within a particular range in the radial direction from the target sector, the refresh control unit 630 increases (increments) the proximity sector write number by a particular value. For example, when data is written in the proximity sector positioned within the particular range in the radial direction from the target sector, the refresh control unit 630 increases (increments) the proximity sector write number by one. When data is written in the outward proximity sector, the refresh control unit 630 increases (increments) the outward proximity sector write number (outward write number) by a particular value. For example, when data is written in the outward proximity sector, the refresh control unit 630 increases (increments) the outward proximity sector write number (outward write number) by one. When data is written in the inward proximity sector, the refresh control unit 630 increases (increments) the inward proximity sector write number (inward write number) by a particular value. For example, when data is written in the inward proximity sector, the refresh control unit 630 increases (increments) the inward proximity sector write number (inward write number) by one.

The refresh control unit 630 counts the write number (hereinafter, may be referred to as an adjacent sector write number) at which data is written in a sector (hereinafter, may be referred to as an adjacent sector) adjacent to the radial side of the target sector. For example, the refresh control unit 630 counts the adjacent sector write number (hereinafter, may be referred to as an outward adjacent sector write number or an outward write number) at which data is written to an adjacent sector (hereinafter, may be referred to as an outward adjacent sector) adjacent to the outer side of the target sector. In addition, for example, the refresh control unit 630 counts the adjacent sector write number (hereinafter, may be referred to as an inward adjacent sector write number or an inward write number) at which data is written to an adjacent sector (hereinafter, may be referred to as an inward adjacent sector) adjacent to the inner side of the target sector.

When data is written in an adjacent sector adjacent to the radial side of the target sector, the refresh control unit 630 increases (increments) the adjacent sector write number by a particular value. For example, when data is written in the adjacent sector adjacent to the radial side of the target sector, the refresh control unit 630 increases (increments) the adjacent sector write number by one. When data is written in the outward adjacent sector, the refresh control unit 630 increases (increments) the outward adjacent sector write number (outward write number) by a particular value. For example, when data is written in the outward adjacent sector, the refresh control unit 630 increases (increments) the outward adjacent sector write number (outward write number) by one. When data is written in the inward adjacent sector, the refresh control unit 630 increases (increments) the inward adjacent sector write number (inward write number) by a particular value. For example, when data is written in the inward adjacent sector, the refresh control unit 630 increases (increments) the inward adjacent sector write number (inward write number) by one.

The refresh control unit 630 executes a process of rewriting the same data as the data written in the target area to the target area (hereinafter, may be referred to as a rewrite, a rewrite process, a refresh, or a refresh process) or a process of overwriting or rewriting the data in the target area (hereinafter, may be referred to as an overwrite process, a rewriting process, a rewrite, a rewrite process, a refresh, or a refresh process). Hereinafter, the rewrite process, the overwrite process, or the rewriting process may be collectively referred to as a rewrite, a rewrite process, a refresh, or a refresh process. The "overwrite" includes "writing data on data written at a particular position in a particular area" and "writing data at the same position in the same area as the data written at the particular position in the particular area".

The refresh control unit 630 has a threshold (hereinafter, may be referred to as a refresh threshold) of the writes number for executing the refresh process corresponding to a particular area. The refresh threshold corresponds to the write number for the area on the radial side of a particular area when the data of this area is affected by ATI which is larger than a specific amount, for example, the amount of data destruction. The refresh control unit 630 may hold the refresh threshold corresponding to a particular area as a table in a particular recording area, for example, the system area 10b of the disk 10, the volatile memory 70, the non-volatile memory 80, the buffer memory 90, or the like.

As illustrated in FIG. 7, in a case where the write processing parameter variation in a particular track is corrected in order to suppress the evaluation index variation in the track, when fringe writing is performed on the adjacent track of the track, the data of a particular area of the track is likely to deteriorate due to the ATI or the like, and the data of another area of the track can be suppressed from being deteriorated by the ATI or the like. Therefore, in a case where the write processing parameter variation in a particular track is corrected in order to suppress the evaluation index variation in the track, it is desirable to set the refresh threshold for each area of the track to reduce the refresh threshold for the area where the data is likely to deteriorate due to the ATI or the like of the track and to increase the refresh threshold for the area where the data is unlikely to deteriorate due to the ATI or the like of the track. In other words, in a case where the write processing parameter variation in a particular track is corrected in order to suppress the evaluation index variation in the track, it is desirable to set the refresh threshold for each area of the track to reduce the refresh threshold for the area which is easily affected by the ATI or the like of the track and to increase the refresh threshold for the area which is hardly affected by the ATI or the like of the track.

The refresh control unit 630 has each refresh threshold (hereinafter, may be referred to as a segmented area threshold) for each segmented area in a particular track. The refresh control unit 630 calculates each segmented area threshold by correcting a certain refresh threshold (hereinafter, may be referred to as a reference threshold) serving as a reference in a particular track for each segmented area according to the write processing parameter variation in the particular track. In other words, the refresh control unit 630 calculates a segmented area threshold variation including a plurality of segmented area thresholds respectively corresponding to a plurality of segmented areas in the particular track for correcting the reference threshold in the particular track according to the write processing parameter variation of the particular track.

For example, the refresh control unit 630 calculates each correction value (hereinafter, may be referred to as a threshold correction value) of each segmented area for correcting each refresh threshold of each segmented area in the particular track according to the TBG value variation corresponding to the correction recording frequency variation proportional to the correction recording density variation in the particular track. In other words, the refresh control unit 630 calculates a threshold correction value variation in the particular track for correcting the refresh threshold variation in the track according to the TBG value variation in the track. Based on the reference threshold of each segmented area and each threshold correction value of each segmented area, the refresh control unit 630 calculates each segmented area threshold of each segmented area. In other words, based on the reference threshold and the threshold correction value variation in the particular track, the refresh control unit 630 calculates a segmented area threshold variation in the track. For example, the refresh control unit 630 calculates the segmented area threshold of each segmented area by integrating the threshold correction value of each segmented area with the reference threshold of each segmented area in the particular track. In other words, the refresh control unit 630 calculates the segmented area threshold variation in the particular track by integrating the threshold correction value variation with the reference threshold in this track. The plurality of segmented area thresholds in the particular track may be different. Some of the plurality of segmented area thresholds in the particular track may be the same.

When it is determined that the write number corresponding to the target area is larger than the refresh threshold corresponding to the target area, the refresh control unit 630 executes the refresh process on the target area. Incidentally, when it is determined that the write number corresponding to the target area is larger than the refresh threshold corresponding to the target area, the refresh control unit 630 executes the refresh process on the track (target track) including the target area. When the refresh process is executed on the target area, the refresh control unit 630 resets the write number corresponding to the target area, for example, to zero.

For example, when it is determined that the write number (for example, the sum of the outward write number and the inward write number) corresponding to the target segmented area is larger than the segmented area threshold corresponding to the target segmented area, the refresh control unit 630 executes the refresh process of reading the target segmented area and rewriting the data of the target segmented area to the same position of the target segmented area. Incidentally, when it is determined that the write number corresponding to the target segmented area is larger than the segmented area threshold corresponding to the target segmented area, the refresh control unit 630 may execute the refresh process of reading the track (target track) including the target segmented area and rewriting the data of the track including the target segmented area to the same position of the track.

Figure 8:
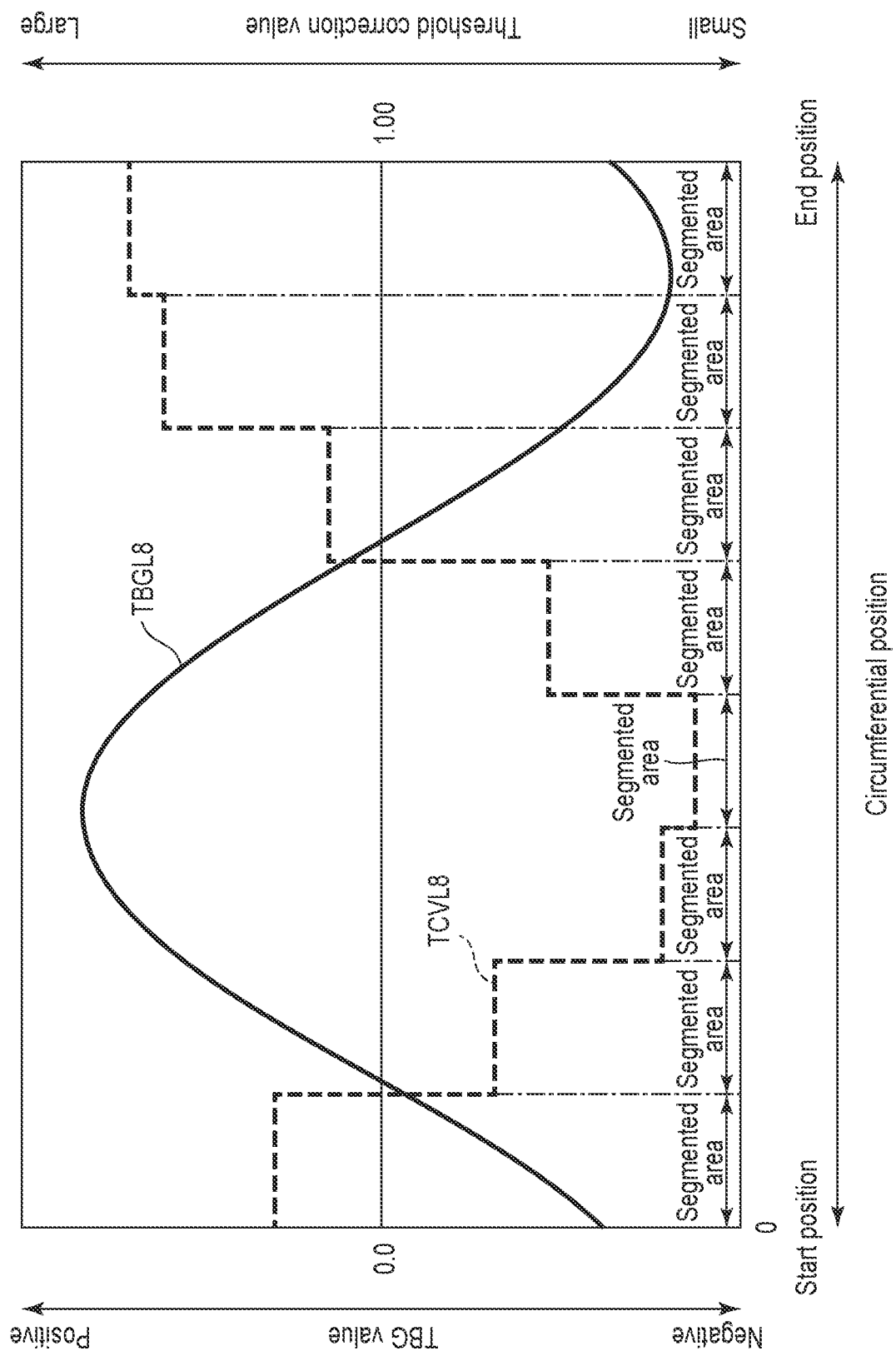
FIG. 8 is a schematic diagram illustrating an example of a TBG value variation with respect to the circumferential position of the particular track and a threshold correction value variation with respect to the circumferential position according to the embodiment.

FIG. 8 is a schematic diagram illustrating an example of the TBG value variation with respect to the circumferential position of the particular track and the threshold correction value variation with respect to the circumferential position according to this embodiment. In FIG. 8, the vertical axis represents a TBG value and a threshold correction value, and the horizontal axis represents a circumferential position. In FIG. 8, the TBG value increases toward the tip side of a positive arrow from the origin (=0), and decreases toward the tip side of a negative arrow from the origin (=0). In FIG. 8, the threshold correction value increases toward the tip side of an arrow of "large" from the origin (=1) and decreases toward the tip side of an arrow of "small" from the origin (=1). The circumferential position on the horizontal axis in FIG. 6 includes a start position and an end position. At the circumferential position on the horizontal axis in FIG. 8, the range from the start position to the end position is segmented for each segmented area. FIG. 8 illustrates a TBG value variation TBGL8 with respect to the circumferential position in a particular track (hereinafter, may be simply referred to as a TBG value variation) and a threshold correction value variation TCVL8 with respect to the circumferential position in the particular track (hereinafter, may be simply referred to as a threshold correction value variation).

In the example illustrated in FIG. 8, the refresh control unit 630 calculates each threshold correction value variation TCVL8 of each segmented area of the particular track according to the TBG variation TBGL8 of the particular track. The refresh control unit 630 performs calculation such that the threshold correction value variation TCVL8 is larger than the origin (=1) in a segmented area in which the TBG variation TBGL8 is smaller than the origin (=0) and the threshold correction value variation TCVL8 is smaller than the origin (=1) in a segmented area in which the TBG variation TBGL8 is larger than the origin (=0). For example, the refresh control unit 630 calculates the threshold correction value variation TCVL8 to have a shape of the TBG variation TBGL8, for example, a shape reverse to a waveform shape. In other words, the refresh control unit 630 calculates the threshold correction value variation TCVL8 to have a shape reverse to the shape (waveform shape) of the write processing parameter variation such as the recording density variation corresponding to the TBG variation TBGL8. For example, the refresh control unit 630 calculates the threshold correction value variation TCVL8 to have a shape reverse to the shape of the correction write processing parameter variation such as the correction recording density variation corresponding to the TBG variation TBGL8.

Figure 9:
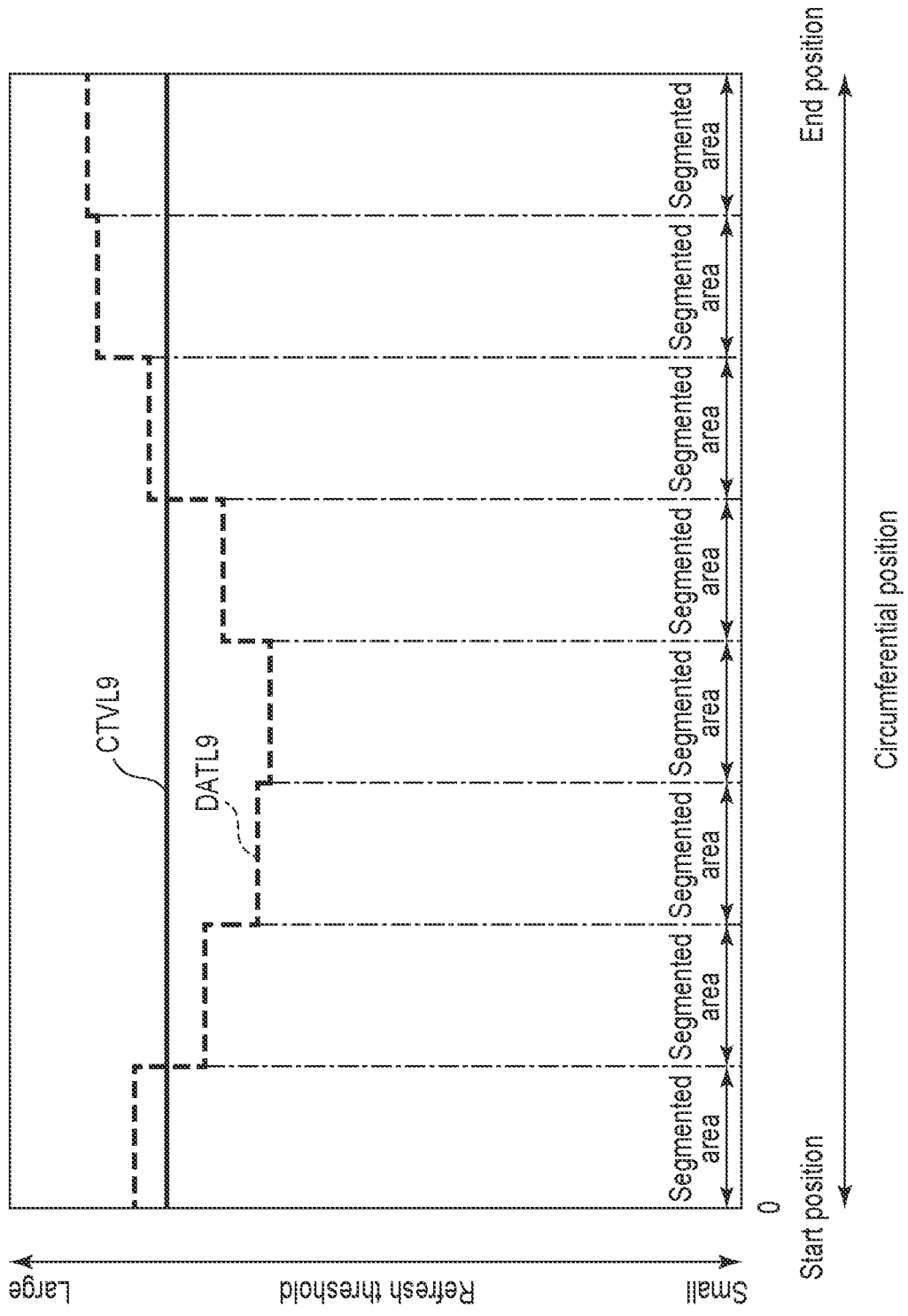
FIG. 9 is a schematic diagram illustrating an example of a segmented area threshold variation with respect to a segmented area of the particular track according to the embodiment.

FIG. 9 is a schematic diagram illustrating an example of a segmented area threshold variation with respect to a segmented area of a particular track according to this embodiment. In FIG. 9, the vertical axis represents a refresh threshold, and the horizontal axis represents a circumferential position. In FIG. 9, the refresh threshold increases toward the tip side of an arrow of "large" and decreases toward the tip side of an arrow of "small". The circumferential position on the horizontal axis in FIG. 9 includes a start position and an end position. At the circumferential position on the horizontal axis in FIG. 9, the range from the start position to the end position is segmented for each segmented area. FIG. 9 illustrates a reference threshold CTVL9 in a particular track and a segmented area threshold variation DATL9 with respect to the segmented area in the particular track (hereinafter, may be simply referred to as a segmented area threshold variation).

In the example illustrated in FIG. 9, the refresh control unit 630 integrates the threshold correction value variation TCVL8 illustrated in FIG. 8 to the reference threshold CTVL9 to calculate each segmented area threshold of each segmented area, and acquires the segmented area threshold variation DATL9. The segmented area threshold variation DATL9 corresponds to the threshold correction value variation TCVL8. In other words, the shape (for example, a waveform shape) of the segmented area threshold variation DATL9 is substantially the same as the shape of the threshold correction value variation TCVL8. The shape of the segmented area threshold variation DATL9 is substantially reversed from the shape of the write processing parameter variation such as the recording density variation corresponding to the TBG variation TBGL8. In a segmented area in which the TBG variation TBGL8 is smaller than the origin (=0), the segmented area threshold variation DATL9 is larger than the reference threshold CTVL9, and in a segmented area where the TBG variation TBGL8 is larger than the origin (=0), the segmented area threshold variation DATL9 is smaller than the reference threshold CTVL9. For example, the segmented area threshold variation DATL9 is small in a segmented area which is easily affected by the ATI when data is written to an adjacent track of a particular track, and is large in a segmented area which is hardly affected by the ATI when data is written to the adjacent track.

Figures 10, 11:
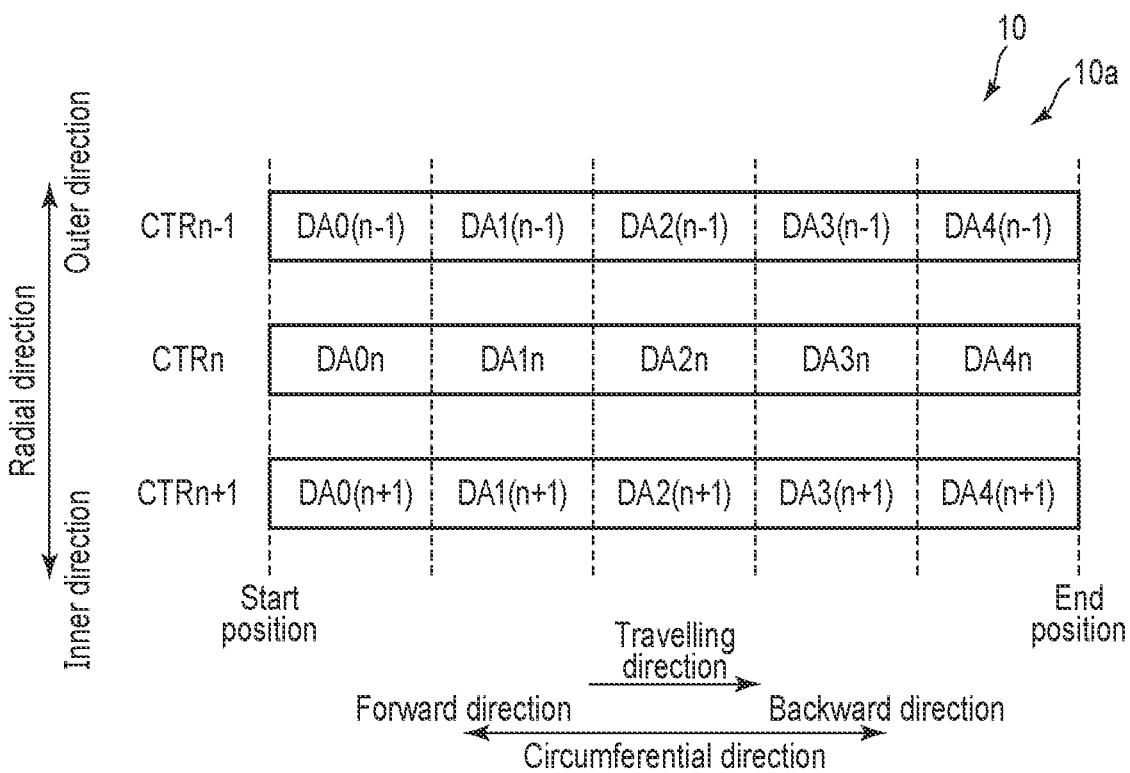
FIG. 10 is a schematic diagram illustrating an example of the segmented area of the particular track.
FIG. 11 is a schematic diagram illustrating an example of a table TB of the number of times of writing and the segmented area threshold according to the embodiment.

FIG. 10 is a schematic diagram illustrating an example of the segmented area of the particular track. FIG. 10 illustrates tracks CTRn−1, CTRn, and CTRn+1. The tracks CTRn−1, CTRn, and CTRn+1 correspond to the tracks CTRn−1, CTRn, and CTRn+1 illustrated in FIG. 4. In the example illustrated in FIG. 10, the track CTRn−1 is segmented into segmented areas DA0(n−1), DA1(n−1), DA2(n−1), DA3(n−1), and DA4(n−1). The segmented areas DA0(n−1), DA1(n−1), DA2(n−1), DA3(n−1), and DA4(n−1) are continuously arranged in the backward direction in the described order. In FIG. 10, the track CTRn is segmented into segmented areas DA0n, DA1n, DA2n, DA3n, and DA4n. The segmented areas DA0n, DA1n, DA2n, DA3n, and DA4n are continuously arranged in the backward direction in the described order. In FIG. 10, the track CTRn+1 is segmented into segmented areas DA0(n+1), DA1(n+1), DA2(n+1), DA3(n+1), and DA4(n+1). The segmented areas DA0(n+1), DA1(n+1), DA2(n+1), DA3(n+1), and DA4(n+1) are continuously arranged in the backward direction in the described order. In the example illustrated in FIG. 10, in the radial direction, the segmented areas DA0(n−1), DA0n, and DA0(n+1) are continuously arranged at intervals in the inner direction in the described order. In the example illustrated in FIG. 10, in the radial direction, the segmented areas DA1(n−1), DA1n, and DA1(n+1) are continuously arranged at intervals in the inner direction in the described order. In the example illustrated in FIG. 10, in the radial direction, the segmented areas DA2(n−1), DA2n, and DA2(n+1) are continuously arranged at intervals in the inner direction in the described order. In the example illustrated in FIG. 10, in the radial direction, the segmented areas DA3(n−1), DA3n, and DA3(n+1) are continuously arranged at intervals in the inner direction in the described order. In the example illustrated in FIG. 10, in the radial direction, the segmented areas DA4(n−1), DA4n, and DA4(n+1) are continuously arranged at intervals in the inner direction in the described order.

In the example illustrated in FIG. 10, when writing is performed on the segmented areas DA0(n−1) and DA0(n+1), the refresh control unit 630 counts the write number of the segmented area DA0n. For example, when writing is performed on the segmented areas DA0(n−1) and DA0(n+1), the refresh control unit 630 increases the write number of the segmented area DA0n by one.

In the example illustrated in FIG. 10, when writing is performed on the segmented areas DA1(n−1) and DA1(n+1), the refresh control unit 630 counts the write number of the segmented area DA1n. For example, when writing is performed on the segmented areas DA1(n−1) and DA1(n+1), the refresh control unit 630 increases the write number of the segmented area DA1n by one.

In the example illustrated in FIG. 10, when writing is performed on the segmented areas DA2(n−1) and DA2(n+1), the refresh control unit 630 counts the write number of the segmented area DA2n. For example, when writing is performed on the segmented areas DA2(n−1) and DA2(n+1), the refresh control unit 630 increases the write number of the segmented area DA2n by one.

In the example illustrated in FIG. 10, when writing is performed on the segmented areas DA3(n−1) and DA3(n+1), the refresh control unit 630 counts the write number of the segmented area DA3n. For example, when writing is performed on the segmented areas DA3(n−1) and DA3(n+

1), the refresh control unit 630 increases the write number of the segmented area DA3$n$ by one.

In the example illustrated in FIG. 10, when writing is performed on the segmented areas DA4($n$−1) and DA4($n$+1), the refresh control unit 630 counts the write number of the segmented area DA4$n$. For example, when writing is performed on the segmented areas DA4($n$−1) and DA4($n$+1), the refresh control unit 630 increases the write number to the segmented area DA4$n$ by one.

FIG. 11 is a schematic diagram illustrating an example of a table TB of the number of times of writing and the segmented area threshold according to this embodiment. In FIG. 11, the table TB includes the track CTRn. The track CTRn corresponds to FIG. 10. In FIG. 11, the table TB includes the segmented areas DA0$n$, DA1$n$, DA2$n$, DA3$n$, and DA4$n$, write numbers WC0$n$, WC1$n$, WC2$n$, WC3$n$, and WC4$n$, and segmented area thresholds RHT0$n$, RHT1$n$, RHT2$n$, RHT3$n$, and RHT4$n$. The table TB may be recorded in a particular recording area, for example, the system area 10$b$ of the disk 10, the volatile memory 70, the non-volatile memory 80, the buffer memory 90, or the like. The segmented areas DA0$n$, DA1$n$, DA2$n$, DA3$n$, and DA4$n$ correspond to the track CTRn. The write number WC0$n$ corresponds to the segmented area DA0$n$. The write number WC1$n$ corresponds to the segmented area DA1$n$. The write number WC2$n$ corresponds to the segmented area DA2$n$. The write number WC3$n$ corresponds to the segmented area DA3$n$. The write number WC4$n$ corresponds to the segmented area DA4$n$. The segmented area threshold RHT0$n$ corresponds to the segmented area DA0$n$. The segmented area threshold RHT1$n$ corresponds to the segmented area DA1$n$. The segmented area threshold RHT2$n$ corresponds to the segmented area DA2$n$. The segmented area threshold RHT3$n$ corresponds to the segmented area DA3$n$. The segmented area threshold RHT4$n$ corresponds to the segmented area DA4$n$.

In the example illustrated in FIG. 11, when writing is performed on the segmented areas DA0($n$−1) and DA0($n$+1), the refresh control unit 630 increases the write number WC0$n$ corresponding to the segmented area DA0$n$ by one. When it is determined that the write number WC0$n$ corresponding to the segmented area DA0$n$ is larger than the segmented area threshold RHT0$n$ corresponding to the segmented area DA0$n$, the refresh control unit 630 executes the refresh process on the segmented area DA0$n$. Incidentally, when it is determined that the write number WC0$n$ corresponding to the segmented area DA0$n$ is larger than the segmented area threshold RHT0$n$ corresponding to the segmented area DA0$n$, the refresh control unit 630 executes the refresh process on the track CTRn.

When writing is performed on the segmented areas DA1($n$−1) and DA1($n$+1), the refresh control unit 630 increases the write number WC1$n$ corresponding to the segmented area DA1$n$ by one. When it is determined that the write number WC1$n$ corresponding to the segmented area DA1$n$ is larger than the segmented area threshold RHT1$n$ corresponding to the segmented area DA1$n$, the refresh control unit 630 executes the refresh process on the segmented area DA1$n$. Incidentally, when it is determined that the write number WC1$n$ corresponding to the segmented area DA1$n$ is larger than the segmented area threshold RHT1$n$ corresponding to the segmented area DA1$n$, the refresh control unit 630 executes the refresh process on the track CTRn.

When writing is performed on the segmented areas DA2($n$−1) and DA2($n$+1), the refresh control unit 630 increases the write number WC2$n$ corresponding to the segmented area DA2$n$ by one. When it is determined that the write number WC2$n$ corresponding to the segmented area DA2$n$ is larger than the segmented area threshold RHT2$n$ corresponding to the segmented area DA2$n$, the refresh control unit 630 executes the refresh process on the segmented area DA2$n$. Incidentally, when it is determined that the write number WC2$n$ corresponding to the segmented area DA2$n$ is larger than the segmented area threshold RHT2$n$ corresponding to the segmented area DA2$n$, the refresh control unit 630 executes the refresh process on the track CTRn.

When writing is performed on the segmented areas DA3($n$−1) and DA3($n$+1), the refresh control unit 630 increases the write number WC3$n$ corresponding to the segmented area DA3$n$ by one. When it is determined that the write number WC3$n$ corresponding to the segmented area DA3$n$ is larger than the segmented area threshold RHT3$n$ corresponding to the segmented area DA3$n$, the refresh control unit 630 executes the refresh process on the segmented area DA3$n$. Incidentally, when it is determined that the write number WC3$n$ corresponding to the segmented area DA3$n$ is larger than the segmented area threshold RHT3$n$ corresponding to the segmented area DA3$n$, the refresh control unit 630 executes the refresh process on the track CTRn.

When writing is performed on the segmented areas DA4($n$−1) and DA4($n$+1), the refresh control unit 630 increases the write number WC4$n$ corresponding to the segmented area DA4$n$ by one. When it is determined that the write number WC4$n$ corresponding to the segmented area DA4$n$ is larger than the segmented area threshold RHT4$n$ corresponding to the segmented area DA4$n$, the refresh control unit 630 executes the refresh process on the segmented area DA4$n$. Incidentally, when it is determined that the write number WC4$n$ corresponding to the segmented area DA4$n$ is larger than the segmented area threshold RHT4$n$ corresponding to the segmented area DA4$n$, the refresh control unit 630 executes the refresh process on the track CTRn.

Figure 12:
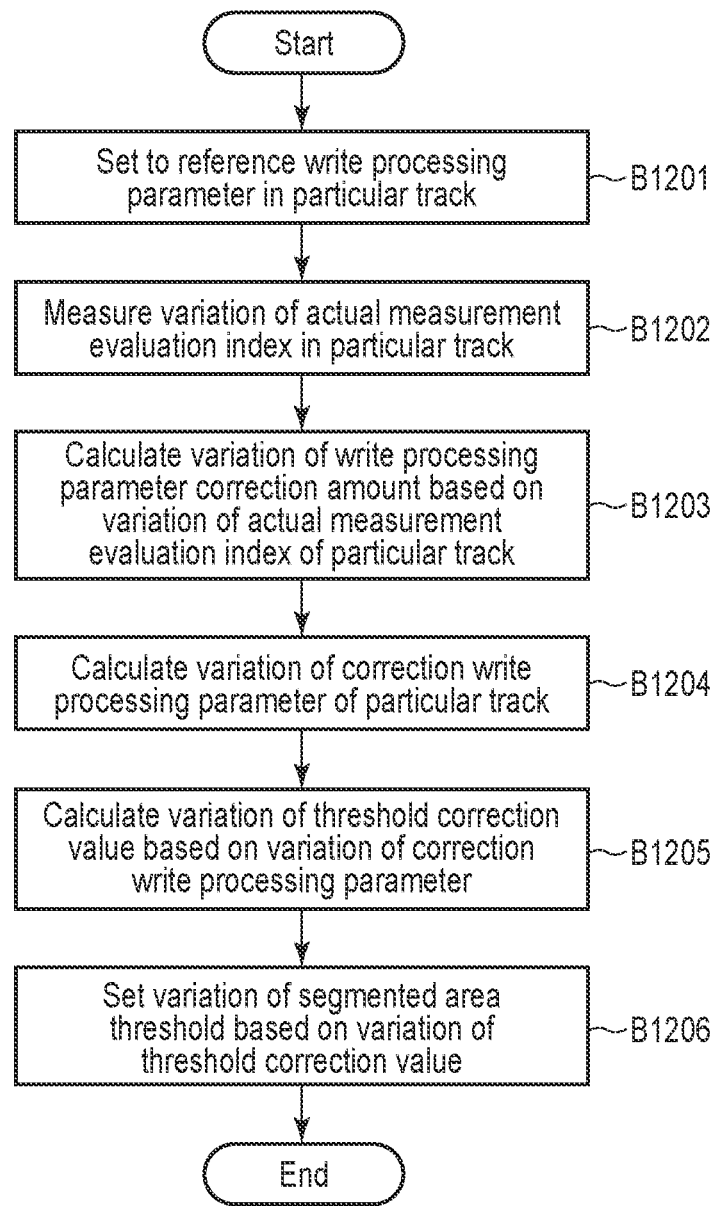
FIG. 12 is a flowchart illustrating an example of a refresh threshold setting method according to the embodiment.

FIG. 12 is a flowchart illustrating an example of a refresh threshold setting method according to this embodiment.

The MPU 60 sets the write processing parameter to the reference write processing parameter in a particular track (B1201), and measures the actual measurement evaluation index variation in this track (B1202). Based on the measured actual measurement evaluation index variation of the particular track, the MPU 60 calculates the write processing parameter correction amount variation in the track for uniformly adjusting or suppressing the actual measurement evaluation index variation in the track (B1203). Based on the variation of the reference write processing parameter and the write processing parameter correction amount, the MPU 60 calculates the correction write processing parameter variation of the particular track (B1204). Based on the correction write processing parameter variation of the particular track, the MPU 60 calculates the threshold correction value variation in the track to reduce the refresh threshold of the area which is easily affected by the ATI or the like of the particular track and to increase the refresh threshold of the area which is hardly affected by the ATI or the like of the track (B1205). In other words, based on the correction write processing parameter variation of the particular track, the MPU 60 calculates each threshold correction value of each segmented area of the track to reduce the refresh threshold of the area which is easily affected by the ATI or the like of the particular track and to increase the refresh threshold of the area which is hardly affected by the ATI or the like of the track. The MPU 60 sets the segmented area threshold variation in the particular track based on the threshold correction value variation in the track (B1206), and ends the process. In other words, the MPU 60 sets each segmented area threshold of each segmented area based on each threshold correction value of each segmented area.

Figure 13:
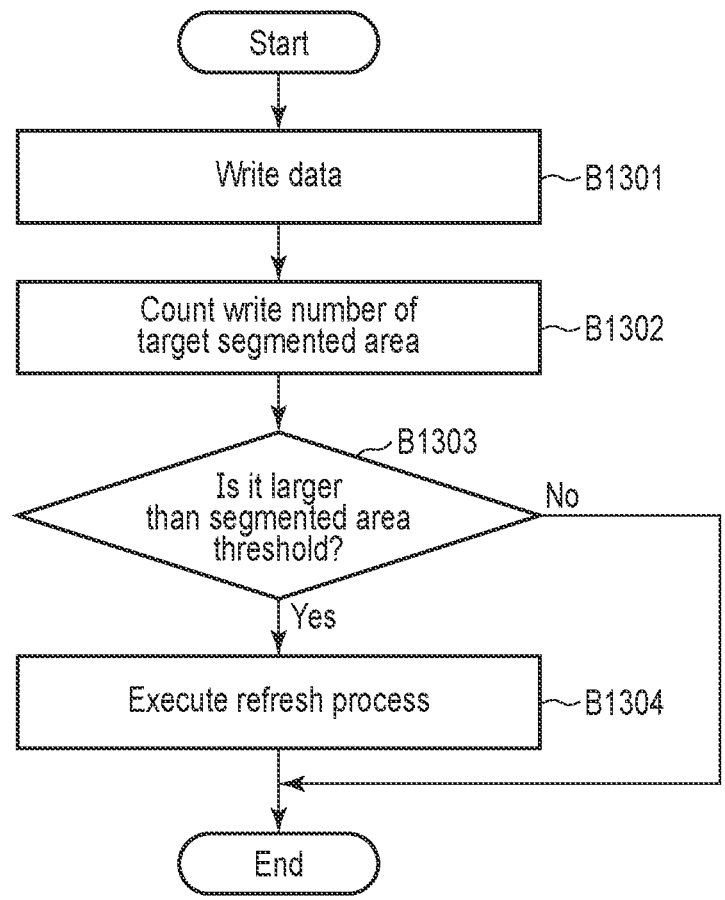
FIG. 13 is a schematic diagram illustrating an example of a refresh processing method according to the embodiment.

FIG. 13 is a schematic diagram illustrating an example of the refresh processing method according to this embodiment.

The MPU 60 writes data to the adjacent segmented area adjacent to the radial side of the target segmented area of the target track (B1301), and counts the write number of the target segmented area (B1302). The MPU 60 determines whether the write number of the target segmented area is larger than the segmented area threshold or equal to or less than the segmented area threshold (B1303). When it is determined that the write number of the target segmented area is equal to or less than the segmented area threshold (NO in B1303), the MPU 60 ends the process. When it is determined that the write number of the target segmented area is larger than the segmented area threshold (YES in B1303), the MPU 60 executes the refresh process on the target segmented area (B1304) and ends the process. Incidentally, when it is determined that the write number of the target segmented area is larger than the segmented area threshold, the MPU 60 may execute the refresh process on the target track.

According to this embodiment, the magnetic disk device 1 sets the write processing parameter to the reference write processing parameter in a particular track, and measures the actual measurement evaluation index variation in this track. Based on the measured actual measurement evaluation index variation of the particular track, the magnetic disk device 1 calculates the write processing parameter correction amount variation in the track for uniformly adjusting or suppressing the actual measurement evaluation index variation in the track. Based on the variation of the reference write processing parameter and the write processing parameter correction amount, the magnetic disk device 1 calculates the correction write processing parameter variation of the particular track. Based on the correction write processing parameter variation of the particular track, the magnetic disk device 1 calculates the threshold correction value variation in the track to reduce the refresh threshold of the area which is easily affected by the ATI or the like of the particular track and to increase the refresh threshold of the area which is hardly affected by the ATI or the like of the track. The magnetic disk device 1 sets the segmented area threshold variation in the particular track based on the threshold correction value variation in the track. Therefore, the magnetic disk device 1 can improve performance and data reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk that includes a first track;
a head that includes a heater, writes data to the disk, and reads data from the disk; and
a controller configured to set a variation of a parameter related to a write process for the disk within one round of the first track to suppress a variation of an evaluation index corresponding to a write/read processing characteristic within one round of the first track, wherein
the controller sets a variation of a refresh threshold for executing a rewrite process within one round of the first track according to the variation of the parameter,
the variation of the refresh threshold includes a plurality of refresh thresholds respectively corresponding to a plurality of segmented areas obtained by segmenting the first track, and
the controller sets the variation of the refresh threshold having a shape reverse to a shape of the variation of the parameter.

2. The magnetic disk device according to claim 1, wherein the controller sets the variation of the refresh threshold to be small in a first segmented area, which is easily affected by a leakage magnetic flux of the head when data is written to an adjacent track adjacent to the first track in a radial direction of the disk, among the segmented areas and to be large in a second segmented area, which is hardly affected by the leakage magnetic flux of the head when data is written to the adjacent track, among the segmented areas.

3. The magnetic disk device according to claim 2, wherein the variation of the evaluation index is a variation of a bit error rate.

4. The magnetic disk device according to claim 3, wherein the variation of the parameter is a variation of a recording density.

5. The magnetic disk device according to claim 3, wherein the variation of the parameter is a variation of a recording current.

6. The magnetic disk device according to claim 4, wherein the variation of the parameter is a variation of a setting value of the heater.

7. The magnetic disk device according to claim 4, wherein the variation of the parameter is a variation of a data transfer speed.

8. The magnetic disk device according to claim 4, wherein the variation of the parameter is a variation of a recording frequency.

9. The magnetic disk device according to claim 1, wherein when it is determined that a first write number of times at which data is written to an adjacent segmented area adjacent to a first segmented area in a radial direction of the disk among the segmented areas is larger than a first refresh threshold corresponding to the first segmented area in the variation of the refresh threshold, the controller rewrites data of the first segmented area.

10. The magnetic disk device according to claim 1, wherein
when it is determined that a first write number of times at which data is written to an adjacent segmented area adjacent to a first segmented area in a radial direction of the disk among the segmented areas is larger than a first refresh threshold corresponding to the first segmented area in the variation of the refresh threshold, the controller rewrites data of the first track.

11. A refresh threshold setting method applied to a magnetic disk device which includes a disk including a first track and a head including a heater, writing data to the disk, and reading data from the disk, the method comprising:
setting a variation of a parameter related to a write process for the disk within one round of the first track to suppress a variation of an evaluation index corresponding to a write/read processing characteristic within one round of the first track;

setting a variation of a refresh threshold for executing a rewrite process in the first track according to the variation of the parameter; and setting the variation of the refresh threshold having a shape reverse to a shape of the variation of the parameter, wherein the variation of the refresh threshold includes a plurality of refresh thresholds respectively corresponding to a plurality of segmented areas obtained by segmenting the first track.

12. The refresh threshold setting method according to claim 11, the method further comprising:

setting the variation of the refresh threshold to be small in a first segmented area, which is easily affected by a leakage magnetic flux of the head when data is written to an adjacent track adjacent to the first track in a radial direction of the disk, among the segmented areas and to be large in a second segmented area, which is hardly affected by the leakage magnetic flux of the head when data is written to the adjacent track, among the segmented areas.

13. The refresh threshold setting method according to claim 12, wherein the variation of the evaluation index is a variation of a bit error rate.

14. The refresh threshold setting method according to claim 13, wherein the variation of the parameter is a variation of a recording density.

15. A magnetic disk device comprising:

a disk that includes a first track;

a head that includes a heater, writes data to the disk, and reads data from the disk; and a controller configured to segment the first track into a plurality of segmented areas, set a plurality of refresh thresholds for executing a rewrite process on respective segmented areas in the first track, and execute the rewrite process of data in the first track when it is determined that a first write number of times at which data is written to an adjacent segmented area adjacent to a first segmented area in a radial direction of the disk among the segmented areas is larger than a first refresh threshold corresponding to the first segmented area among the refresh thresholds.

* * * * *